US012653182B2

(12) United States Patent
Wolan et al.

(10) Patent No.: US 12,653,182 B2
(45) **Date of Patent: *Jun. 16, 2026**

(54) STABLE 1-METHYLCYCLOPROPENE COMPOSITIONS AND USES THEREOF

(71) Applicant: Fresh Inset S.A., Torun (PL)

(72) Inventors: Andrzej Jan Wolan, Torun (PL); Lucyna Czajkowska, Kwidzyn (PL); Katarzyna Anna Guranowska, Grebocin (PL); Marcin Rakowiecki, Torun (PL); Joanna Andrusiak, Badkowo (PL); Mariusz Jan Bosiak, Torun (PL)

(73) Assignee: Fresh Inset S.A., Torun (PL)

( * ) Notice: Subject to any disclaimer, the term of this patent is extended or adjusted under 35 U.S.C. 154(b) by 218 days.

This patent is subject to a terminal disclaimer.

(21) Appl. No.: 18/211,954

(22) Filed: Jun. 20, 2023

(65) Prior Publication Data

US 2024/0114896 A1 Apr. 11, 2024

Related U.S. Application Data

(63) Continuation of application No. 17/162,652, filed on Jan. 29, 2021, now Pat. No. 11,730,166.

(60) Provisional application No. 62/969,260, filed on Feb. 3, 2020.

(51) Int. Cl.

| | |
|---|---|
| ***A01N 3/02*** | (2006.01) |
| ***A01G 7/02*** | (2006.01) |
| ***A01N 3/00*** | (2006.01) |
| ***B65B 25/04*** | (2006.01) |
| ***B65D 83/14*** | (2025.01) |

(52) U.S. Cl.

CPC ................. *A01N 3/02* (2013.01); *A01G 7/02* (2013.01); *A01N 3/00* (2013.01); *B65B 25/041* (2013.01); *B65D 83/14* (2013.01)

(58) Field of Classification Search

CPC ............ A01N 3/02; A01N 3/00; A01N 27/00; A01N 25/06; A01N 25/22; A01G 7/02; B65B 25/041; B65D 83/14; A01P 21/00; A23B 7/144; A23B 7/154

See application file for complete search history.

(56) References Cited

U.S. PATENT DOCUMENTS

| | | | |
|---|---|---|---|
| 5,518,988 | A | 5/1996 | Sisler et al. |
| 5,547,693 | A | 8/1996 | Krochta et al. |
| 6,017,849 | A | 1/2000 | Daly et al. |
| 6,770,600 | B1 | 8/2004 | Lamola et al. |
| 8,822,382 | B2 | 9/2014 | Mir |
| 9,074,106 | B2 | 7/2015 | Wood et al. |
| 9,320,288 | B2 | 4/2016 | Wood et al. |
| 9,353,282 | B2 | 5/2016 | Wood et al. |
| 9,394,216 | B2 | 7/2016 | Mir |
| 9,421,793 | B2 | 8/2016 | Wood et al. |
| 9,642,356 | B2 | 5/2017 | Wood et al. |
| 9,675,069 | B2 | 6/2017 | Wood et al. |
| 9,713,329 | B2 | 7/2017 | Wood et al. |
| 10,182,567 | B2 | 1/2019 | Wood et al. |
| 10,212,931 | B2 | 2/2019 | Wood et al. |
| 10,376,472 | B2 | 8/2019 | Wood et al. |
| 10,647,834 | B2 | 5/2020 | Wolan et al. |
| 11,248,109 | B2 | 2/2022 | Wolan et al. |
| 11,730,166 | B2 | 8/2023 | Wolan et al. |
| 12,043,733 | B2 | 7/2024 | Wolan et al. |
| 2002/0043730 | A1 | 4/2002 | Chong et al. |
| 2002/0107295 | A1 | 8/2002 | Edmundson et al. |
| 2005/0069533 | A1 | 3/2005 | Millan et al. |
| 2005/0074490 | A1 | 4/2005 | Lin et al. |
| 2005/0260907 | A1 | 11/2005 | Chang et al. |
| 2007/0275101 | A1 | 11/2007 | Lu et al. |
| 2011/0143004 | A1 | 6/2011 | Wood et al. |
| 2012/0258220 | A1 | 10/2012 | Jacobson |
| 2013/0029058 | A1 | 1/2013 | Wood et al. |
| 2013/0251926 | A1 | 9/2013 | Wood et al. |
| 2013/0280388 | A1 | 10/2013 | Ekanayake et al. |
| 2014/0017134 | A1 | 1/2014 | Yoo et al. |
| 2014/0080712 | A1 | 3/2014 | Lao et al. |
| 2014/0094369 | A1 | 4/2014 | Baier et al. |
| 2014/0154370 | A1 | 6/2014 | Wood et al. |
| 2015/0018430 | A1 | 1/2015 | Williamson et al. |
| 2015/0366189 | A1 | 12/2015 | Becker |
| 2017/0150716 | A1 | 6/2017 | Chang et al. |

(Continued)

FOREIGN PATENT DOCUMENTS

| | | |
|---|---|---|
| CN | 1412227 | 4/2003 |
| CN | 1759700 | 4/2006 |

(Continued)

OTHER PUBLICATIONS

Gmp-compliance.org [online], "What are the regulatory Definitions for 'Ambient', 'Room Temperature' and 'Cold Chain'?" Feb. 3, 2017, retrieved on Apr. 30, 2025, retrieved from URL<https://www.gmp-compliance.org/gmp-news/what-are-the-regulatory-definitions-for-ambient-room-temperature-and-cold-chain>, 5 pages.
Yoshino et al., "[Surprisingly Unknown Difference between the Units of Molecular Weight and Mass]," Seibutu-Kougaku Kaisi (Japanese Journal of the Society for Biotechnology), Aug. 2013, 91(8):464-468 (with Machine Translation).
[No Author Listed], "FAO Specifications and Evaluations for Agricultural Pesticides 1-Methylcyclopropene," Food and Agriculture Organization of the United Nations, Jan. 2010, 30 pages.
Blankenship & Dole, "1-Methylcyclopropene: a review," Postharv Biol. Technol., 2003, 28(1):1-25.
Chen et al., "Delivery Formulations for Modifying Ethylene Response of Fresh Produce," Dissertation for the degree of Doctor of Philosophy, The State University of New Jersey, Graduate Program in Food Science, Oct. 2015, 126 pages.

(Continued)

*Primary Examiner* — Erin E Hirt
*Assistant Examiner* — Grant Thomas Kinsey
(74) *Attorney, Agent, or Firm* — Fish & Richardson P.C.

(57) ABSTRACT

Stable compositions comprising 1-methylcyclopropene and a low volatility stabilizer, and methods of using the composition, are provided. Methods for using the compositions in delaying the maturation of plants, such as fruits, vegetables, and flowers are also provided.

24 Claims, 12 Drawing Sheets

(56) References Cited

U.S. PATENT DOCUMENTS

| | | | |
|---|---|---|---|
| 2018/0064106 | A1 | 3/2018 | Coles et al. |
| 2019/0330451 | A1 | 10/2019 | Wolan et al. |
| 2020/0277470 | A1 | 9/2020 | Wolan et al. |
| 2021/0235692 | A1 | 8/2021 | Wolan et al. |
| 2021/0332158 | A1 | 10/2021 | Wood et al. |
| 2022/0372251 | A1 | 11/2022 | Wolan et al. |
| 2025/0051555 | A1 | 2/2025 | Wolan et al. |
| 2025/0136794 | A1 | 5/2025 | Wolan et al. |

FOREIGN PATENT DOCUMENTS

| | | | |
|---|---|---|---|
| CN | 101636446 | 1/2010 | |
| CN | 101715760 | 6/2010 | |
| CN | 102532611 | 7/2012 | |
| CN | 102726377 | 10/2012 | |
| CN | 103459356 | 12/2013 | |
| CN | 102440237 B * | 6/2014 | ............. A01N 27/00 |
| CN | 104086574 | 10/2014 | |
| CN | 104341257 | 2/2015 | |
| CN | 105357962 | 2/2016 | |
| CN | 105437676 | 3/2016 | |
| CN | 106928015 | 7/2017 | |
| CN | 108184989 | 6/2018 | |
| CN | 108770845 | 11/2018 | |
| EP | 1192859 | 4/2002 | |
| EP | 1236397 | 9/2002 | |
| EP | 1237411 | 9/2002 | |
| EP | 1304035 | 4/2003 | |
| EP | 1340425 | 9/2003 | |
| EP | 1593306 | 11/2005 | |
| EP | 1597968 | 11/2005 | |
| EP | 2109641 | 10/2009 | |
| EP | 3180981 | 6/2017 | |
| JP | 2012-219096 | 11/2012 | |
| JP | 2016-538003 | 12/2016 | |
| JP | 2017-532367 | 11/2017 | |
| KR | 1988-0009664 A | 10/1988 | |
| KR | 2010-0004516 | 1/2010 | |
| KR | 10-2012-0105563 A | 9/2012 | |
| KR | 10-2013-0010482 A | 1/2013 | |
| KR | 10-2015-0058331 A | 5/2015 | |
| MX | 2015003420 | 11/2015 | |
| MX | 2015014899 | 5/2016 | |
| MX | 2015014900 | 5/2016 | |
| MX | 2017002034 | 7/2017 | |
| WO | WO 2001/043548 | 6/2001 | |
| WO | WO 2002/046290 | 6/2002 | |
| WO | WO 2003/075892 | 9/2003 | |
| WO | WO 2004/101668 | 11/2004 | |
| WO | WO 2007/103336 | 9/2007 | |
| WO | WO 2008/089140 | 7/2008 | |
| WO | WO 2011/081877 | 7/2011 | |
| WO | WO 2011/103793 | 9/2011 | |
| WO | WO 2012/134539 | 10/2012 | |
| WO | WO 2014/040288 | 3/2014 | |
| WO | WO 2014/059209 | 7/2014 | |
| WO | WO 2014/113375 | 7/2014 | |
| WO | WO 2014/172899 | 10/2014 | |
| WO | WO 2014/172900 | 10/2014 | |
| WO | WO 2016/023297 | 2/2016 | |
| WO | WO 2017/039960 | 3/2017 | |
| WO | WO 2017/143311 | 8/2017 | |
| WO | WO 2018/098154 | 5/2018 | |
| WO | WO 2019/133076 | 7/2019 | |

OTHER PUBLICATIONS

Chopra et al., "Metal-organic frameworks have utility in adsorption and release of ethylene and 1-methylcyclopropene in fresh produce packaging," Postharvest Biol. Tech., 2017, 130:48-55.

De Martino et al, "1-MCP controls ripening induced by impact injury on apricots by affecting SOD and POX activities," Postharvest Biology and Technology, 2006, 39:38-47.

Fisher et al., "Synthesis of 1-Methylcyclopropene," J. Org. Chem., Jun. 1965, 30(6):2089-90.

Gamrasni et al, "1-Methylcyclopropene (1-MCP) application to *Spadona* pears at different stages of ripening to maximize fruit quality after storage," Postharvest Biology and Technology, 2010, 58:104-112.

Hassan et al., "Effect of 1-methylcyclopropene (1-MCP) treatment on sweet basil leaf senescence and ethylene production during shelf-life," Postharvest Biology and Technology, 2010, 55:61-65.

Huber et al, "Use of 1-methylcyclopropene (1-MCP) on tomato and avocado fruits for growth and quality retention," University of Florida, IFAS Extension, 2003, HS914, 3 pages.

Huber, "Suppression of Ethylene Responses Through Application of 1-Methylcyclopropene: A Powerful Tool for Elucidating Ripening and Senescence Mechanisms in Climacteric and Nonclimacteric Fruits and Vegetables," HortScience, Feb. 2008, 43(1):106-111.

Kasim et al, "The effect of packaging after 1- MCP treatment on color changes and chlorophyll degradation of broccoli (*Brassica oleracea* var. *Italica* cv. *Monopoly*,)" Journal of Food, Agriculture & Environment, 2007, 5(3&4):48-51.

Keller et al, "Ethylene Removal and Fresh Product Storage: A Challenge at the Frontiers of Chemistry. Toward an Approach by Photocatalytic Oxidation," Chem. Rev., 2013, 113:5029-5070.

Liou et al., "Factors affecting ethylene sensitivity and 1-MCP response in tulip bulbs," Postharvest Biology and Technology, 2011, 59:238-244.

Magid et al., "An Efficient and Convenient Synthesis of 1-Methylcyclopropene," J. Org. Chem., May 1971, 36(9):1320-1.

McArtney et al, "Preharvest 1-methylcyclopropene delays fruit maturity and reduces softening and superficial scald of apples during long-term storage," HortScience, 2008, 43(2):366-371.

Menniti et al., "Responses of 1-MCP application in plums under air and controlled atmospheres," Postharvest Biology and Technology, 2006, 39:243-246.

Neoh et al., "Kinetics of molecular encapsulation of 1-methylcyclopropene into α-cyclodextrin," J. Agric. Food Chem., 2007, 55(26):11020-11026.

Neoh et al., "Dissociation characteristic of the inclusion complex of cyclomaltohexaose (α-cyclodextrin) with 1 methylcyclopropene in response to stepwise rising relative humidity," Carbohydr. Res., Sep. 2010, 345(14):2085-2089.

Nevicolor.it [online], "DuPont Packaging & Industrial Polymers, Elvax 250," Aug. 2010, retrieved on Mar. 8, 2023, retrieved from URL <https://www.nevicolor.it/produkte/polymer-suchen/dupont/elvax/allegati/elvax-250.pdf>, 3 pages.

PCT International Preliminary Report on Patentability in International Appln. No. PCT/EP2019/060816, dated Oct. 27, 2020, 9 pages.

PCT International Search Report and Written Opinion in International Appln. No. PCT/EP2019/060816, dated Jul. 30, 2019, 14 pages.

PCT International Search Report and Written Opinion in International Appln. No. PCT/IB2021/050746 dated Apr. 19, 2021, 15 pages.

Permana et al., "Characterization of 1-MCP Gas from Synthesis of Various Ratios of Lithium Diisopropylamide (LDA) and 3-Chloro-2-Methylpropene (CMP)," II Asia Pacific Symposium on Postharvest Research Education and Extension, Sep. 2012, 351-6.

Saltveit, "Effect of ethylene on quality of fresh fruits and vegetables," Postharv. Biol. Technol., 1999, 15:279-292.

Sisler et al., "Compounds interacting with the ethylene receptor in plants," Plant Biol., May 2003:473-480.

Sislert et al., "Anti-Ethylene Effects of CIS-2-Butene and Cyclic Olefins" Phytochemistry, 1984, 23(12):2765-8.

Watkins, "Postharvest effects on the quality of horticultural products: using 1-MCP to understand the effects of ethylene on ripening and senescence processes," Acta Hort., 2008, 768:19-32.

Watkins, "The effect of 1-MCP on the development of physiological storage disorders in horticultural crops," Stewart Postharvest Rev., Feb. 2007:11, 6 pages.

Watkins, "The use of 1-methylcyclopropene (1-MCP) on fruits and vegetables," Biotechnol. Adv., Jul.-Aug. 2006, 24(4):389-409.

(56) References Cited

OTHER PUBLICATIONS

Wikipedia.com [online], “Room Temperature”, Apr. 2018, retrieved on Apr. 26, 2024, retrieved from URL<https://en.wikipedia.org/w/index.php?title=Room_temperature&oldid=837666316>.
Zhang et al., “Encapsulation of the Ethylene Inhibitor 1-Methylcyclopropene by Cucurbit[6]uril,” J. Agric. Food Chem., 2011, 59:10539-10545.
U.S. Appl. No. 16/456,128, filed Jun. 28, 2019, Andrzej Wolan, now U.S. Pat. No. 10,647,834.
U.S. Appl. No. 16/870,333, filed May 8, 2020, Andrzej Wolan, now U.S. Pat. No. 11,248,109.
U.S. Appl. No. 17/567,599, filed Jan. 3, 2022, Andrzej Wolan, now U.S. Pat. No. 12,043,733.
U.S. Appl. No. 18/618,537, filed Mar. 27, 2024, Andrzej Wolan, Pending.

* cited by examiner

STABLE 1-METHYLCYCLOPROPENE COMPOSITIONS AND USES THEREOF

CROSS-REFERENCE TO RELATED APPLICATION

This application is a continuation of patent application Ser. No. 17/162,652 filed Jan. 29, 2021, which claims priority to U.S. Provisional Application No. 62/969,260, filed on Feb. 3, 2020, which is incorporated by reference herein in its entirety.

TECHNICAL FIELD

This invention relates to compositions comprising 1-methylcyclopropene and low volatility compounds (e.g., cis-2-butene), and use of the compositions in delaying the maturation of plants, e.g., fruits, vegetables, and flowers.

BACKGROUND

Ethylene affects a wide range of physiological processes in plants (including fruits, vegetables, flowers, ornamental plants, herbs, seeds, nuts, fungi, and grains), such as drooping, aging and maturation, chlorophyll loss, softening, physiological disorders, germination, isocoumarin synthesis, lignification, discoloration (browning), decomposition, and stimulation of defense systems. When growing and storing plant and plant products, it is essential to control the influence of ethylene to prolong the freshness of these products, delay their maturation, and decelerate browning and aging.

One of the methods used is to inhibit the action of ethylene by blocking ethylene receptors in plant cells. 1-Methylcyclopropene (1-MCP) is a gas that has been used to block ethylene receptors in plant cells. Liquid or gaseous 1-MCP decomposes rapidly at room temperature to form dimers, oligomers, degradation products, and/or oxidation products via free-radical processes and therefore cannot be stored for long periods in pure form. As such, 1-MCP is typically complexed with host compounds such as, e.g., cyclodextrin, cucurbit[6]uril, and metal-organic frameworks for storage and use. When used as a complex with cyclodextrin, it is necessary to expose the complex to water (e.g., in the form of humidity) to release the 1-MCP from the cyclodextrin.

SUMMARY

In a first aspect, herein is disclosed a composition that comprises:

1-methylcyclopropene; and a stabilizer;

wherein the concentration of the 1-methylcyclopropene does not change substantially after at least 4 hours;

with the proviso that the 1-methylcyclopropene is not complexed to another molecule.

In some embodiments, the stabilizer is selected from the group consisting of: a lower alkane, a lower alkene, a lower dialkyl ether, a lower trialkylamine, and combinations thereof.

In some embodiments, the stabilizer comprises cis-2-butene.

In some embodiments, the composition comprises from about 0.1% to about 50% by weight of the 1-methylcyclopropene.

In some embodiments, the composition comprises from about 0.1% to about 10% by weight of the stabilizer.

In some embodiments, the composition is a liquid.

In some embodiments, the concentration of the 1-methylcyclopropene does not change substantially after at least 4 weeks.

In some embodiments, the composition further comprises:

a solvent; and at least one component selected from the group consisting of: a polymer, a plasticizer, a surfactant, and an adjuvant.

In some embodiments, the composition is a gas and further comprises nitrogen, oxygen and carbon dioxide.

In some embodiments (when the composition is a gas and further comprises nitrogen, oxygen and carbon dioxide), the composition comprises from about 1% to about 10% by weight of the 1-methylcyclopropene.

In some embodiments (when the composition is a gas and further comprises nitrogen, oxygen and carbon dioxide), the composition comprises from about 1% to about 10% by volume of the 1-methylcyclopropene.

In some embodiments (when the composition is a gas and further comprises nitrogen, oxygen and carbon dioxide), the composition comprises from about 80% to about 94% by weight of the nitrogen; from about 3% to about 10% by weight of the oxygen; and from about 3% to about 10% by weight of the carbon dioxide.

In some embodiments (when the composition is a gas and further comprises nitrogen, oxygen and carbon dioxide), the composition comprises from about 80% to about 94% by volume of the nitrogen; from about 3% to about 10% by volume of the oxygen; and from about 3% to about 10% by volume of the carbon dioxide.

In some embodiments (when the composition is a gas and further comprises nitrogen, oxygen and carbon dioxide), the composition comprises from about 0.1% to about 10% by weight of the stabilizer.

In some embodiments (when the composition is a gas and further comprises nitrogen, oxygen and carbon dioxide), the composition comprises from about 0.1% to about 10% by volume of the stabilizer.

In a second aspect, herein is disclosed an aerosol dispensing container containing the composition of the first aspect, wherein the composition is under a pressure of greater than 1 atm.

In some embodiments of the aerosol dispensing container, the composition further comprises a propellant.

In some embodiments of the aerosol dispensing container, the composition further comprises:

a solvent; and at least one component selected from the group consisting of: a polymer, a plasticizer, a surfactant, and an adjuvant.

In some embodiments of the aerosol dispensing container, the composition is stored at a pressure of about 2 atm to about 10 atm. In some other embodiments of the aerosol dispensing container, the composition is stored at a pressure of about 10 atm to about 100 atm.

In some embodiments of the aerosol dispensing container, the inside of the container is substantially free of transition metals.

In a third aspect, herein is disclosed a method of preserving the freshness of a plant, comprising contacting the plant with the composition of the first aspect.

In some embodiments, the plant is a fruit or vegetable. In some embodiments, the plant is a flower.

In some embodiments, the contacting comprises spraying the composition of the first aspect on the plant.

In a fourth aspect, herein is disclosed a method of packaging a plant, comprising:

placing the plant inside a chamber;

adding the composition of the first aspect (when the composition further comprises nitrogen, oxygen and carbon dioxide) to the inside of the chamber; and packaging the plant inside the chamber.

In some embodiments, the plant is a fruit or vegetable. In some embodiments, the plant is a flower.

The stabilizer is understood to inhibit free radical oligomerization (e.g., dimerization) and oxidation that normally occurs in 1-MCP, thus precluding the decomposition of 1-MCP. In addition, in stabilized 1-MCP compositions that further comprise oxygen, the oxygen reacts faster with the stabilizer than with 1-methylcyclobutene. As such, the compositions described herein provide an alternative means of storing and using 1-MCP that does not require complexation with host compounds thereby circumventing the costs and additional processing associated with complexation. Further, when cis-2-butene or isobutene are used as the stabilizer, the efficacy of the composition in preserving the freshness of plants is higher than in 1-MCP or cis-2-butene alone (i.e., synergy is observed between the 1-MCP and cis-2-butene).

For purposes of clarification, it is understood that "the concentration of the 1-methylcyclopropene does not change substantially after at least 4 hours" means that little to no change (e.g., less than 10%, less than 9%, less than 8%, less than 7%, less than 6%, less than 5%, less than 4%, less than 3%, less than 2%, less than 1%, less than 0.5%, less than 0.2%, less than 0.1%, less than 0.05%, less than 0.02%, or less than 0.01% change) in the concentration of the 1-methylcyclopropene occurs at least 4 hours after an initial measurement of the concentration is taken, wherein the initial measurement is taken within 1 hour after formation of the composition. The concentration of 1-MCP (e.g., the initial measurement of the molar concentration of 1-MCP and a measurement taken after at least one day after the initial measurement) is measured by gas chromatography (GC) using cis-2-butene as an internal standard. Further, (i) the amount of internal standard included in each measured sample is the same, and (ii) the volume of sample injected into the gas chromatograph in each measurement is the same.

The term "lower alkane" as used herein refers to an alkane that includes from 1 to 4 carbon atoms. Lower alkanes include, for example, methane, ethane, propane, butane (e.g., n-butane or isobutane), cyclopropane, and cyclobutane.

The term "lower alkene" as used herein refers to an alkene that includes from 3 to 4 carbon atoms. Lower alkenes include, for example, propene and butene (e.g., 1-butene, 2-butene (e.g., cis-2-butene and trans-2-butene), and isobutylene). Alkenes may be optionally substituted with one or more halo (e.g., one or more fluoro). Optionally substituted lower alkenes include, for example, 1,3,3,3-tetrafluoropropene and 2,3,3,3-tetrafluoropropene.

The term "lower dialkyl ether" as used herein refers to a dialkyl ether that includes from 2 to 4 carbon atoms. Lower dialkyl ethers include, for example, dimethyl ether, methyl ethyl ether, diethyl ether, methyl isopropyl ether, and methyl n-propyl ether.

The term "lower trialkylamine" as used herein refers to a trialkylamine that includes from 3 to 6 carbon atoms. Lower trialkylamines include, for example, trimethylamine, dimethylethylamine, methyl diethylamine, and triethylamine.

The details of one or more embodiments of the invention are set forth in the accompanying drawings and the description below. Other features, objects, and advantages of the invention will be apparent from the description and drawings, and from the claims.

Figure 11:
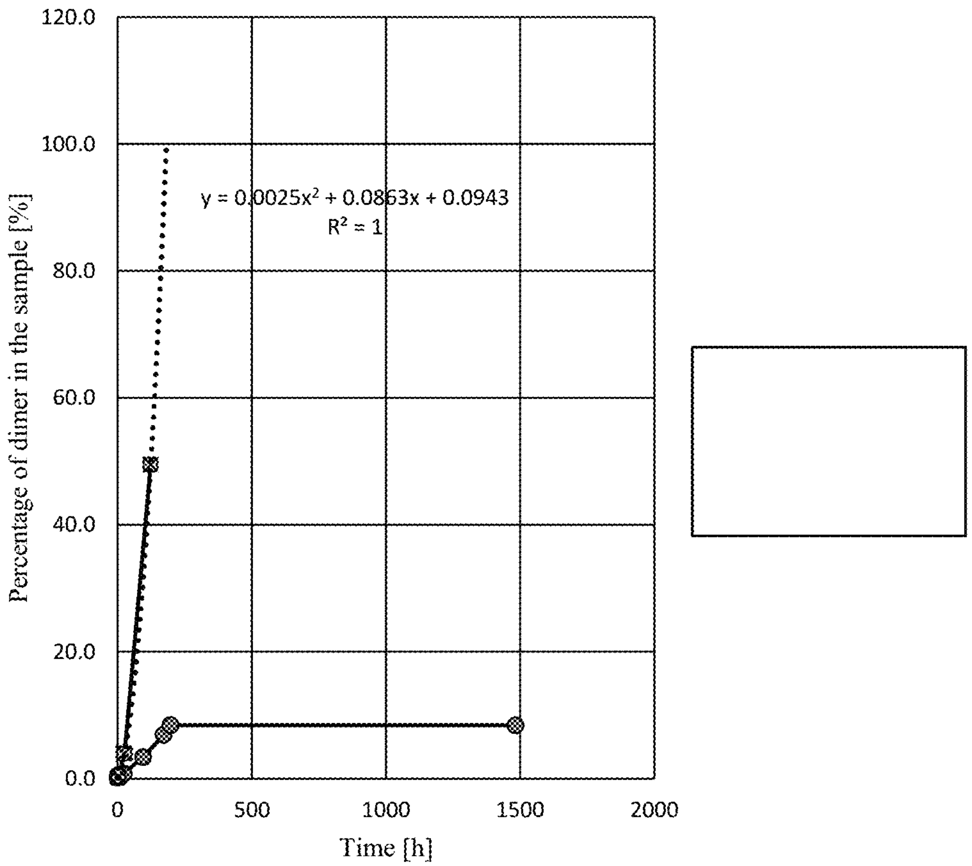

FIG. 11 is an overlay of (1) a plot of the percentage of dimers measured by GC at points over time in a composition including 1-MCP and butane in a 1:1 volume:volume ratio and (2) a plot of the percentage of dimers measured by GC at points over time in 1-MCP.

Like reference symbols in the various drawings indicate like elements.

DETAILED DESCRIPTION

Herein are described compositions comprising 1-methylcyclopropene (1-MCP) and a stabilizer useful for preserving the freshness of plants.

Compositions

In one aspect, herein is disclosed a composition that comprises:

1-methylcyclopropene; and a stabilizer.

In another aspect, herein is disclosed a composition that comprises:

1-methylcyclopropene; and a stabilizer;

wherein the concentration of the 1-methylcyclopropene does not change substantially after at least four hours.

In another aspect, herein is disclosed a composition that comprises:

1-methylcyclopropene; and a stabilizer;

wherein the concentration of the 1-methylcyclopropene does not change substantially after at least four hours;

with the proviso that the 1-methylcyclopropene is not complexed to another molecule.

In some embodiments, the stabilizer has a low volatility. For example, the stabilizer has a vapor pressure that is from about 1700 to about 9000 Torr (e.g., from about 1750 Torr to about 8750 Torr, from about 1750 Torr to about 1950 Torr, from about 3200 Torr to about 3600 Torr, from about 8400 Torr to about 8800 Torr, about 1875 Torr, about 3430 Torr, or about 8700 Torr) at about 50° C. under normal pressure. In some embodiments, the stabilizer is selected from the group consisting of: a lower alkane, a lower alkene, a lower dialkyl ether, a lower trialkylamine, and combinations thereof. In some embodiments, the stabilizer is a lower alkane. Lower alkanes include, for example, methane, ethane, propane, butane (e.g., n-butane or isobutane), cyclopropane, and cyclobutane. In some embodiments, the stabilizer is a lower alkene. Lower alkenes include, for example, propene, butene (e.g., 1-butene, 2-butene (e.g., cis-2-butene and trans-2-butene), and isobutylene), 1,3,3,3-tetrafluoropropene, and 2,3,3,3-tetrafluoropropene. In some embodiments, the stabilizer is a lower dialkyl ether. Lower dialkyl ethers include, for example, dimethyl ether, methyl ethyl ether, diethyl ether, methyl isopropyl ether, and methyl n-propyl ether. In some embodiments, the stabilizer is a lower trialkylamine. Lower trialkylamines include, for example, trimethylamine, dimethylethylamine, methyl diethylamine, and triethylamine. In some embodiments, the stabilizer comprises cis-2-butene. For example, the stabilizer is cis-2-butene.

In some embodiments, the composition comprises from about 0.01% to about 50% by weight of the 1-methylcyclopropene. For example, the composition comprises from about 0.01% to about 0.1%, from about 0.1% to about 1%, from about 1% to about 3%, from about 3% to about 5%, from about 5% to about 10%, from about 10% to about 20%, from about 20% to about 30%, from about 30% to about 40%, from about 40% to about 50%, from about 0.01% to about 5%, from about 0.01% to about 10%, from about 0.01% to about 25%, from about 0.01% to about 40%, from about 0.1% to about 50%, from about 5% to about 50%, from about 10% to about 50%, from about 30% to about 50%, from about 5% to about 40%, or from about 10% to about 30% by weight of the 1-methylcyclopropene. For example, the composition comprises about 0.01%, about 0.1%, about 1%, about 3%, about 5%, about 7.5%, about 10%, about 12.5%, about 15%, about 17.5%, about 20%, about 22.5%, about 25%, about 27.5%, about 30%, about 32.5%, about 35%, about 37.5%, about 40%, about 42.5%, about 45%, about 47.5%, or about 50% by weight of the 1-methylcyclopropene.

In some embodiments, the composition comprises from about 0.01% to about 50% by weight of the stabilizer. For example, the composition comprises about 0.01% to about 1%, about 0.1% to about 0.8%, about 0.1% to about 1%, about 1% to about 2%, about 2% to about 3%, about 3% to about 4%, about 4% to about 5%, about 5% to about 6%, about 6% to about 7%, about 7% to about 8%, about 8% to about 9%, about 9% to about 10%, about 0.1% to about 5%, about 0.1% to about 10%, about 0.1% to about 20%, about 0.1% to about 30%, about 0.1% to about 40%, about 0.1% to about 50%, about 10% to about 50%, about 20% to about 50%, about 30% to about 50%, about 40% to about 50% by weight of the stabilizer. For example, the composition comprises about 0.1%, about 0.15%, about 0.3%, about 0.5%, about 0.7%, about 1%, about 2%, about 3%, about 4%, about 5%, about 6%, about 7%, about 8%, about 9%, or about 10% by weight of the stabilizer. For example, the composition comprises about 1% by weight of the stabilizer.

In some embodiments, the composition is a liquid.

In some embodiments, the concentration of the 1-methylcyclopropene does not change substantially after at least 4 hours. For example, the concentration of the 1-methylcyclopropene does not change substantially after at least 4 hours, at least 8 hours, at least 12 hours, at least 16 hours, at least 20 hours, at least 24 hours, at least 28 hours, at least 32 hours, at least 36 hours, at least 40 hours, at least 44 hours, at least 48 hours, at least 2.5 days, at least 3 days, at least 3.5 days, at least 4 days, at least 5 days, at least 6 days, at least 7 days, at least 8 days, at least 9 days, at least 10 days, at least 20 days, at least 4 weeks, at least 2 months, at least 3 months, at least 4 months, at least 5 months, at least 6 months, at least 7 months, at least 8 months, at least 9 months, at least 10 months, at least 11 months, at least 1 year, at least 1.5 years, at least 2 years, at least 3 years, at least 4 years, at least 5 years, or at least 10 years.

In some embodiments, the composition comprises substantially no water. In some of these embodiments, the composition comprises less than 5% by weight of water. For example, the composition comprises less than 4%, less than 3%, less than 2%, less than 1%, less than 0.5%, or less than 0.1% by weight of water. In some embodiments, the composition comprises no water. In some embodiments (when the composition is in the form of a gas), the humidity of the gas is less than 100%. For example, the humidity of the gas is less than 90%, less than 80%, less than 50%, less than 30%, less than 20%, less than 10%, less than 5%, less than 2%, or less than 1%.

In some embodiments, the composition further comprises a solvent.

In some embodiments, the composition comprises about 1% to about 99% by weight of the solvent. For example, the composition comprises from about 40% to about 99%, from about 50% to about 99%, from about 60% to about 99%, from about 70% to about 99%, from about 75% to about 99%, from about 80% to about 99%, from about 85% to about 99%, from about 90% to about 99%, from about 90% to about 96%, from about 93% to about 96%, from about 80% to about 96%, from about 84% to about 92%, from about 83% to about 89%, about 83%, about 85%, about 87%, about 89%, about 92%, or about 95% of the solvent.

In some embodiments, the composition further comprises a propellant. Propellants include, but are not limited to, argon, methane, ethane, propane, butane (e.g., n-butane or isobutane), propene, 1-butene, cis-2-butene, trans-2-butene, nitrous oxide, nitrogen, carbon dioxide, dimethyl ether, methyl ethyl ether, 1,3,3,3-tetrafluoropropene, 2,3,3,3-tetrafluoropropene, chlorofluorocarbons (e.g., trichloromonofluoromethane, dichlorodifluoromethane, dichlorotetrafluoroethane, chlorodifluoromethane, trifluoromonofluoroethane, chlorodifluoroethane, difluoroethane, and heptafluoropropane), air, and combinations thereof. In some embodiments, the propellant comprises propane and butane.

In some embodiments, the composition comprises about 1% to about 99% by weight of the propellant. For example, the composition comprises from about 40% to about 99%, from about 50% to about 99%, from about 60% to about 99%, from about 70% to about 99%, from about 75% to about 99%, from about 80% to about 99%, from about 85% to about 99%, from about 90% to about 99%, from about 90% to about 96%, from about 93% to about 96%, from about 80% to about 96%, from about 84% to about 92%, from about 83% to about 89%, about 83%, about 85%, about 87%, about 89%, about 92%, or about 95% of the propellant.

In some embodiments, the composition comprises from about 4% to about 13% by weight of 1-methylcyclopropene, from about 0.1% to about 1% by weight of the stabilizer, and from about 81% to about 96% by weight of the propellant.

In some embodiments, the composition comprises from about 8% to about 11% by weight of 1-methylcyclopropene, from about 0.1% to about 1% by weight of the stabilizer, and from about 81% to about 96% by weight of the propellant.

In some embodiments, the composition comprises from about 4% to about 13% by weight of 1-methylcyclopropene, from about 2% to about 8% by weight of the stabilizer, and from about 81% to about 96% by weight of the propellant.

In some embodiments, the composition comprises from about 8% to about 11% by weight of 1-methylcyclopropene, from about 2% to about 8% by weight of the stabilizer, and from about 81% to about 96% by weight of the propellant.

In some embodiments, the composition comprises from about 4% to about 13% by weight of 1-methylcyclopropene, from about 0.1% to about 1% by weight of the stabilizer, and from about 81% to about 96% by weight of the propellant.

In some embodiments, the composition comprises from about 8% to about 11% by weight of 1-methylcyclopropene, from about 0.1% to about 1% by weight of the stabilizer, and from about 81% to about 96% by weight of the propellant.

In some embodiments, the composition comprises from about 4% to about 13% by weight of 1-methylcyclopropene, from about 2% to about 8% by weight of the stabilizer, and from about 81% to about 96% by weight of the propellant.

In some embodiments, the composition comprises from about 8% to about 11% by weight of 1-methylcyclopropene, from about 2% to about 8% by weight of the stabilizer, and from about 81% to about 96% by weight of the propellant.

In some embodiments, the composition further comprises at least one component selected from the group consisting of: a polymer, a plasticizer, a surfactant, and an adjuvant. It is understood that the polymer, plasticizer, surfactant, and/or adjuvant enables the composition to adhere to the surface of a plant and, in certain embodiments, release 1-MCP over time.

In some embodiments, the composition further comprises:

a solvent; and at least one component selected from the group consisting of: a polymer, a plasticizer, a surfactant, and an adjuvant.

Solvents include, but are not limited to, acetone, acetonitrile, dichloromethane, methanol, ethanol, isopropanol, chloroform, diethyl ether, methyl tert-butyl ether, methyl ethyl ketone, glycerol, carbon tetrachloride, cyclohexane, toluene, anisole, pyridine, acetic acid, hexane, xyleen, dimethyl sulfoxide, N,N-dimethylacetamide, N,N-dimethylformamide, tetrahydrofuran, and petroleum ether.

Polymers include, but are not limited to, shellac, polyvinylpyrrolidone, vinylpyrrolidone-vinyl acetate copolymers, vinyl acetate-crotonic acid, methyl vinyl-ethyl maleate copolymers, butyl maleate, tert-butylacrylamide-ethyl acrylate-acrylic acid copolymers, acrylate-acrylamide copolymers, vinylcaprolactam-vinylpyrrolidone-dimethylaminoethyl methacrylate copolymers, and any combination thereof.

Plasticizers include, but are not limited to, aminomethyl propanol, aminomethyl propanediol, triisopropyl amine, dimethyl stearamine, triethanolamine, bis(2-ethylhexyl) phthalate (DEHP), bis(2-propylheptyl) phthalate (DPHP), diisononyl phthalate (DINP), di-n-butyl phthalate (DnBP or DBP), butyl benzyl phthalate (BBzP), diisodecyl phthalate (DIDP), dioctyl phthalate (DOP or DnOP), diisooctyl phthalate (DIOP), diethyl phthalate (DEP), diisobutyl phthalate (DIBP), di-n-hexyl phthalate, trimethyl trimellitate (TMTM), tri-(2-ethylhexyl) trimellitate (TEHTM)(TOTM), tri-(n-octyl,n-decyl) trimellitate (ATM), tri-(heptyl,nonyl) trimellitate (LTM), n-octyl trimellitate (OTM), bis(2-ethylhexyl)adipate (DEHA), dimethyl adipate (DMAD), monomethyl adipate (MMAD), dioctyl adipate (DOA), dibutyl sebacate (DBS), dibutyl maleate (DBM), diisobutyl maleate (DIBM), azelates, benzoates, terephthalates (e.g., dioctyl terephthalate/DEHT), 1,2-Cyclohexane dicarboxylic acid diisononyl ester, alkyl sulphonic acid phenyl ester (ASE), sulfonamides (e.g., N-ethyl toluene sulfonamide (o/p ETSA), N-(2-hydroxypropyl) benzene sulfonamide (HP BSA), or N-(n-butyl) benzene sulfonamide (BBSA-NBBS)), organophosphates (e.g., tricresyl phosphate (TCP) or tributyl phosphate (TBP)), glycols and polyethers (e.g., triethylene glycol dihexanoate (3G6 or 3GH) and tetraethylene glycol diheptanoate (4G7)), polymeric plasticizers, polybutene, acetylated monoglycerides, alkyl citrates (e.g., triethyl citrate (TEC), acetyl triethyl citrate (ATEC), tributyl citrate (TBC), acetyl tributyl citrate (ATBC), trioctyl citrate (TOC), acetyl trioctyl citrate (ATOC), trihexyl citrate (THC), acetyl trihexyl citrate (ATHC), butyryl trihexyl citrate (BTHC or trihexyl o-butyryl citrate), and trimethyl citrate (TMC)), methyl ricinoleate, epoxidized soybean oil (ESBO), epoxidized vegetable oils, nitroglycerine, butanetriol trinitrate (BTTN), dinitrotoluene (DNT), and any combination thereof.

Surfactants include, but are not limited to, polysorbates (e.g., tweens), sodium dodecyl sulfate (sodium lauryl sulfate), lauryl dimethyl amine oxide, cetyltrimethylammonium bromide (CTAB), polyethoxylated alcohols, polyoxyethylene sorbitan, octoxynol, N,N-dimethyldodecylamine- N-oxide, hexadecyltrimethylammonium bromide (HTAB), polyoxyl 10 lauryl ether, bile salts (e.g., sodium deoxycholate and sodium cholate), polyoxyl castor oil, nonylphenol ethoxylate, cyclodextrins, lecithin, methylbenzethonium chloride benzalkonium chloride, dimethicone, and any combination thereof.

Adjuvants include, but are not limited to oils (e.g., crop oil (e.g., paraffinic oil or petroleum oil) and vegetable oil), compatibility agents, buffering agents (e.g., monopotassium phosphate, monosodium phosphate, disodium phosphate, monopotassium phosphate, dipotassium phosphate, calcium carbonate), conditioning agents (e.g., polyquaterniums), defoaming agents (e.g., kerosene, fuel oil, vegetable oil, fatty alcohols, polydimethylsiloxane, hydrophobic silica, ethylene bis stearamide, paraffin waxes, ester waxes, polyethylene glycol-polypropylene glycol, alkyl polyacrylates, simethicone), anti-settling agents (e.g., fumed silica), deposition agents, drift control agents (e.g., polyacrylamides), thickeners (e.g., alginic acid, agar, carrageenan, locust bean gum, pectin, gelatin, polyurethanes (e.g., acrylic polymers, latex, styrene, butadiene), polyvinyl alcohol, clays (e.g., attapulgite, bentonite, monmorillonite clays, cellulosics, sulfonates, guar gum, xanthan gum, cellulose, acacia gum, pullulan, konjac, casein, collagen, albumin, modified castor oil, and organosilicones (e.g., silicone resins, dimethicones, and modified silicones)), fertilizers (e.g., nitrogen-based fertilizers, phosphate fertilizers, and potassium fertilizers), foam markers, tank cleaners, colorants, suspension agents (e.g., alginates, methylcellulose, hydroxyethylcellulose, carboxymethylcellulose, sodium carboxymethylcellulose, microcrystalline cellulose, acacia, tragacanth, xanthan gum, bentonite, carbomer, carageenan, powdered cellulose, and gelatin), tackifiers (e.g., rosins, terpenes, modified terpenes, hydrogenated hydrocarbon resins, terpene-phenol resins, and novolacs), and any combination thereof.

In some embodiments, the composition is a gas. In some of these embodiments, the composition further comprises nitrogen, oxygen, carbon dioxide, argon, or any combination thereof. For example, the composition comprises nitrogen, oxygen, and/or carbon dioxide. For example, the composition comprises nitrogen. For example, the composition comprises carbon dioxide. For example, the composition comprises oxygen. For example, the composition comprises argon. In some embodiments, the composition is a gas and further comprises nitrogen, oxygen and carbon dioxide.

In some embodiments (when the composition is a gas), the composition comprises from about 0.1% to about 20% by weight of the 1-methylcyclopropene. For example, the composition comprises from about 1% to about 10%, from about 1% to about 3%, from about 3% to about 6%, or from about 6% to about 10% by weight of the 1-methylcyclopropene. For example, the composition comprises about 0.1%, about 1%, about 2%, about 3%, about 4%, about 5%, about 6%, about 7%, about 8%, about 9%, or about 10% by weight of the 1-methylcyclopropene.

In some embodiments (when the composition is a gas), the composition comprises from about 0.1% to about 20% by volume of the 1-methylcyclopropene. For example, the composition comprises from about 1% to about 10%, from about 1% to about 3%, from about 3% to about 6%, or from about 6% to about 10% by volume of the 1-methylcyclopropene. For example, the composition comprises about 0.1%, about 1%, about 2%, about 3%, about 4%, about 5%, about 6%, about 7%, about 8%, about 9%, or about 10% by volume of the 1-methylcyclopropene.

In some embodiments (when the composition is a gas), the composition comprises from about 40% to about 98% by weight of the nitrogen. For example, the composition comprises from about 50% to about 96%, from about 60% to about 96%, from about 70% to about 96%, or from about 80% to about 94% by weight of the nitrogen. For example, the composition comprises from about 80% to about 94% by weight of the nitrogen. For example, the composition comprises about 50%, about 60%, about 70%, about 80%, about 82.5%, about 85%, about 87.5%, about 90%, about 92.5%, or about 94% by weight of the nitrogen.

In some embodiments (when the composition is a gas), the composition comprises from about 40% to about 98% by volume of the nitrogen. For example, the composition comprises from about 50% to about 96%, from about 60% to about 96%, from about 70% to about 96%, or from about 80% to about 94% by volume of the nitrogen. For example, the composition comprises from about 80% to about 94% by volume of the nitrogen. For example, the composition comprises about 50%, about 60%, about 70%, about 80%, about 82.5%, about 85%, about 87.5%, about 90%, about 92.5%, or about 94% by volume of the nitrogen.

In some embodiments (when the composition is a gas), the composition comprises from about 0.1% to about 20% by weight of the oxygen. For example, the composition comprises from about 1% to about 20%, from about 1% to about 15%, from about 3% to about 10%, from about 3% to about 6%, from about 6% to about 10%, or from about 5% to about 8% by weight of the oxygen. For example, the composition comprises from about 3% to about 10% by weight of the oxygen. For example, the composition comprises about 3%, about 4%, about 5%, about 6%, about 7%, about 8%, about 9%, or about 10% by weight of the oxygen.

In some embodiments (when the composition is a gas), the composition comprises from about 0.1% to about 20% by volume of the oxygen. For example, the composition comprises from about 1% to about 20%, from about 1% to about 15%, from about 3% to about 10%, from about 3% to about 6%, from about 6% to about 10%, or from about 5% to about 8% by volume of the oxygen. For example, the composition comprises from about 3% to about 10% by volume of the oxygen. For example, the composition comprises about 0.1%, about 1%, about 2%, about 3%, about 4%, about 5%, about 6%, about 7%, about 8%, about 9%, or about 10% by volume of the oxygen.

In some embodiments (when the composition is a gas), the composition comprises from about 0.1% to about 20% by weight of the carbon dioxide. For example, the composition comprises from about 1% to about 20%, from about 1% to about 15%, from about 3% to about 10%, from about 3% to about 6%, from about 6% to about 10%, or from about 5% to about 8% by weight of the carbon dioxide. For example, the composition comprises from about 3% to about 10% by weight of the carbon dioxide. For example, the composition comprises about 0.1%, about 1%, about 2%, about 3%, about 4%, about 5%, about 6%, about 7%, about 8%, about 9%, or about 10% by weight of the carbon dioxide.

In some embodiments (when the composition is a gas), the composition comprises from about 0.1% to about 20% by volume of the carbon dioxide. For example, the composition comprises from about 1% to about 20%, from about 1% to about 15%, from about 3% to about 10%, from about 3% to about 6%, from about 6% to about 10%, or from about 5% to about 8% by volume of the carbon dioxide. For example, the composition comprises from about 3% to about 10% by volume of the carbon dioxide. For example, the composition comprises about 0.1%, about 1%, about 2%, about 3%, about 4%, about 5%, about 6%, about 7%, about 8%, about 9%, or about 10% by volume of the carbon dioxide.

In some embodiments (when the composition is a gas), the individual amounts of the nitrogen, oxygen, and carbon dioxide are as described above and in any combination.

In some embodiments (when the composition is a gas), the composition comprises from about 80% to about 94% by weight of the nitrogen; from about 3% to about 10% by weight of the oxygen; and from about 3% to about 10% by weight of the carbon dioxide.

In some embodiments (when the composition is a gas), the composition comprises from about 80% to about 94% by volume of the nitrogen; from about 3% to about 10% by volume of the oxygen; and from about 3% to about 10% by volume of the carbon dioxide.

In some embodiments (when the composition is a gas), the composition comprises from about 0.1% to about 50% by weight of the stabilizer. For example, the composition comprises from about 0.1% to about 20%, about 0.1% to about 15%, about 0.1% to about 12%, about 0.1% to about 10%, about 0.1% to about 8%, about 0.1% to about 6%, about 0.1% to about 5%, about 0.1% to about 4%, about 0.1% to about 2%, about 0.1% to about 1%, about 0.5% to about 7%, about 0.5% to about 5%, about 0.5% to about 2%, or about 0.5% to about 1.5% by weight of the stabilizer. For example, the composition comprises from about 0.1% to about 10% by weight of the stabilizer. For example, the composition comprises about 0.1%, about 0.5%, about 1%, about 2%, about 3%, about 4%, about 5%, about 7%, about 8%, about 9%, or about 10% by weight of the stabilizer. For example, the composition comprises about 1% by weight of the stabilizer.

In some embodiments (when the composition is a gas), the composition comprises from about 0.1% to about 50% by volume of the stabilizer. For example, the composition comprises from about 0.1% to about 20%, about 0.1% to about 15%, about 0.1% to about 12%, about 0.1% to about 10%, about 0.1% to about 8%, about 0.1% to about 6%, about 0.1% to about 5%, about 0.1% to about 4%, about 0.1% to about 2%, about 0.1% to about 1%, about 0.5% to about 7%, about 0.5% to about 5%, about 0.5% to about 2%, or about 0.5% to about 1.5% by volume of the stabilizer. For example, the composition comprises from about 0.1% to about 10% by volume of the stabilizer. For example, the composition comprises about 0.1%, about 0.5%, about 1%, about 2%, about 3%, about 4%, about 5%, about 7%, about 8%, about 9%, or about 10% by volume of the stabilizer. For example, the composition comprises about 1% by volume of the stabilizer.

In some embodiments (when the composition is a gas), the composition comprises from about 0.1% to about 10% by volume of 1-methylcyclopropene, from about 0.1% to about 10% by volume of the stabilizer, and from about 80% to about 98.8% by volume of the propellant.

In some embodiments (when the composition is a gas), the concentration of the 1-methylcyclopropene does not change substantially after at least 4 hours. For example, the concentration of the 1-methylcyclopropene does not change substantially after at least 3.25 hours, at least 4 hours, at least 5 hours, at least 8 hours, at least 12 hours, at least 16 hours, at least 20 hours, at least 23.25 hours, at least 24 hours, at least 28 hours, at least 32 hours, at least 36 hours, at least 40 hours, at least 44 hours, at least 48 hours, at least 95.25 hours, at least 172 hours, at least 197.25 hours, at least 1483.25 hours, at least 2.5 days, at least 3 days, at least 3.5 days, at least 4 days, at least 5 days, at least 6 days, at least 7 days, at least 8 days, at least 9 days, at least 10 days, at least 16 days, at least 20 days, at least 23 days, at least 24 days, at least 4 weeks, at least 36 days, at least 39 days, at least 43 days, at least 50 days, at least 56 days, at least 57 days, at least 59 days, at least 2 months, at least 64 days, at least 71 days, at least 105 days, at least 3 months, at least 147 days, at least 182 days, at least 269 days, at least 310 days, at least 557 days, at least 4 months, at least 5 months, at least 6 months, at least 7 months, at least 8 months, at least 9 months, at least 10 months, at least 11 months, at least 1 year, at least 1.5 years, at least 2 years, at least 3 years, at least 4 years, at least 5 years, or at least 10 years.

In some embodiments, the composition comprises a pesticide. In some of these embodiments, the pesticide comprises an insecticide, a nematicide, a molluscicide, a rodenticide, a bactericide, an insect repellent, an animal repellent, an antimicrobial agent, and/or a fungicide. Non-limiting examples of insecticides include carbofuran, phorate, chlorpyriphos, monocrotophos, carbaryl, fenobucarb, ethofenprox, endosulfan, dichlorovos, cartap hydrochloride, quinalphos, acephate, carbosulfan, methyl demeton, dimethoate, methyl parathion, and triazophos. Non-limiting examples of fungicides include acibenzolar, anilazine, benomyl, binapacryl, tetraconazole, tebuconazole, propioconazole, azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, metconazole, myclobutanil, penconazole, prothioconazole, simeconazole, triadimefon, triadimenol, triticonazole, imazalil, oxpoconazole, pefurazoate, prochloraz, triflumizole, fenarimol, nuarimol, triforine, pyrifenox azoxystrobin, enestrobin, picoxystrobin, pyraclostrobin, trifloxystrobin, dimoxystrobin, metominostrobin, orysastrobin, famoxadonem, fluoxastrobin, fenamidone, or pyribencarb. Non-limiting examples of nematocides include aldicarb, halocarbon DBCP, 1,3-dichloropropene, chloropicrin, methyl bromide, ethylene dibromide, 1,2-dibromo-3-chloropropane, metam sodium, dazomet, methyl isothiocyanate, sodium tetrathiocarbonate, ethoprop, fenamiphos, cadusafos, aldoxycarb, carbofuran, oxamyl, or fosthiazate. Non-limiting examples of antibacterial agents include benzalkonium chloride and triclosan.

In some embodiments, the composition comprises from about 0.1% to about 30% by weight of the pesticide. For example, the composition comprises from about 0.1% to about 25%, about 0.1% to about 20%, about 0.1% to about 15%, about 0.1% to about 10%, about 0.1% to about 5%, about 0.1% to about 3%, about 0.1% to about 2%, about 0.1% to about 1%, about 0.1% to about 0.5%, about 2% to about 10%, about 5% to about 15%, about 10% to about 20%, about 0.1%, about 0.2%, about 0.4%, about 0.5%, about 0.7%, about 1%, about 2%, about 3%, about 4%, about 5%, about 6%, about 7%, about 8%, about 9%, about 10%, about 12.5%, about 15%, about 17.5%, about 20%, about 22.5%, or about 25% by weight of the pesticide.

In some embodiments, the composition comprises from about 0.1% to about 30% by volume of the pesticide. For example, the composition comprises from about 0.1% to about 25%, about 0.1% to about 20%, about 0.1% to about 15%, about 0.1% to about 10%, about 0.1% to about 5%, about 0.1% to about 3%, about 0.1% to about 2%, about 0.1% to about 1%, about 0.1% to about 0.5%, about 2% to about 10%, about 5% to about 15%, about 10% to about 20%, about 0.1%, about 0.2%, about 0.4%, about 0.5%, about 0.7%, about 1%, about 2%, about 3%, about 4%, about 5%, about 6%, about 7%, about 8%, about 9%, about 10%, about 12.5%, about 15%, about 17.5%, about 20%, about 22.5%, or about 25% by volume of the pesticide.

In some embodiments, the 1-methylcyclopropene is not complexed to another molecule. For example, the 1-methylcyclopropene is not complexed to a host compound or a metal complex. For purposes of illustration, a complex of 1-methylcyclopropene with a host compound is one in which 1-MCP is bound to the host compound through intermolecular forces (for example, ionic bonding, hydrogen bonds, halogen bonds, van der Waals forces, hydrophobic interactions, and any combination thereof) due to the lower Gibbs free energy of the complex in comparison to that of the 1-MCP and host compound alone. Non-limiting examples of host compounds include cyclodextrins (e.g., α-cyclodextrin, β-cyclodextrin, and γ-cyclodextrin), carbohydrates, porphyrins, phosphazenes, macrocyclic polyethers (e.g., crown ethers), calixarenes, and cucurbiturils (e.g., cucurbit[6]uril). In some embodiments, the compositions do not include 1-MCP adsorbed to an adsorbent. Non-limiting examples of compounds or materials that adsorb 1-MCP include carbon (e.g., any carbon allotrope (e.g., carbon black, lampblack carbon, activated carbon, charcoal, anthracite, coal, coke, vitreous carbon, glassy carbon, ash, reactivated carbon, soot, and bone charcoal)), metal-organic frameworks (e.g., basolite C300 and basolite A520), silicate materials (e.g., polysiloxanes, polyalkylsiloxanes, polyalkylenesiloxanes, and polyoxoalkylene materials), metal oxides, zeolites (e.g., Zeolite Z13X), metal coordination polymer networks, and silicon dioxide (e.g., silica gel). In some embodiments, the compositions do not include a complex of 1-methylcyclopropene with a host compound (e.g., cyclodextrins (e.g., α-cyclodextrin, β-cyclodextrin, and γ-cyclodextrin), carbohydrates, porphyrins, phosphazenes, macrocyclic polyethers (e.g., crown ethers), calixarenes, metal-organic frameworks (e.g., basolite C300 and basolite A520), cucurbiturils (e.g., cucurbit[6]uril)) or a metal complex; and 1-MCP adsorbed to an adsorbent (including carbon (e.g., any carbon allotrope (e.g., carbon black, lampblack carbon, activated carbon, charcoal, anthracite, coal, coke, vitreous carbon, glassy carbon, ash, reactivated carbon, soot, and bone charcoal)), metal-organic frameworks (e.g., basolite C300 and basolite A520), silicate materials (e.g., polysiloxanes, polyalkylsiloxanes, polyalkylenesiloxanes, and polyoxoalkylene materials), metal oxides, zeolites (e.g., Zeolite Z13X), metal coordination polymer networks, and silicon dioxide (e.g., silica gel).

Articles

In another aspect, there is described an aerosol dispensing container containing any composition as described herein;

wherein the composition is a liquid; and wherein the composition is under a pressure of greater than 1 atm.

In some embodiments, the composition contained in the aerosol dispensing container further comprises a propellant. Propellants include, but are not limited to, argon, methane, ethane, propane, butane (e.g., n-butane or isobutane), propene, 1-butene, cis-2-butene, trans-2-butene, nitrous oxide, nitrogen, carbon dioxide, dimethyl ether, methyl ethyl ether, 1,3,3,3-tetrafluoropropene, 2,3,3,3-tetrafluoropropene, chlorofluorocarbons (e.g., trichloromonofluoromethane, dichlorodifluoromethane, dichlorotetrafluoroethane, chlorodifluoromethane, trifluoromonofluoroethane, chlorodifluoroethane, difluoroethane, and heptafluoropropane), air, and combinations thereof. In some embodiments, the propellant comprises propane. In some embodiments, the propellant comprises butane. In some embodiments, the propellant comprises isobutane.

In some embodiments, the composition comprises about 1% to about 99% by weight of the propellant. For example, the composition comprises from about 40% to about 99%, from about 50% to about 99%, from about 60% to about 99%, from about 70% to about 99%, from about 75% to about 99%, from about 80% to about 99%, from about 85% to about 99%, from about 90% to about 99%, from about 90% to about 96%, from about 93% to about 96%, from about 80% to about 96%, from about 84% to about 92%, from about 83% to about 89%, about 83%, about 85%, about 87%, about 89%, about 92%, or about 95% of the propellant.

In some embodiments, the composition comprises about 1% to about 99% by volume of the propellant. For example, the composition comprises from about 40% to about 99%, from about 50% to about 99%, from about 60% to about 99%, from about 70% to about 99%, from about 75% to about 99%, from about 80% to about 99%, from about 85% to about 99%, from about 90% to about 99%, from about 90% to about 96%, from about 93% to about 96%, from about 80% to about 96%, from about 84% to about 92%, from about 83% to about 89%, about 83%, about 85%, about 87%, about 89%, about 92%, or about 95% of the propellant.

In some embodiments, the concentration of the 1-methylcyclopropene does not change substantially after at least 4 hours. For example, the concentration of the 1-methylcyclopropene does not change substantially after at least 4 hours, at least 8 hours, at least 12 hours, at least 16 hours, at least 20 hours, at least 24 hours, at least 28 hours, at least 32 hours, at least 36 hours, at least 40 hours, at least 44 hours, at least 48 hours, at least 2.5 days, at least 3 days, at least 3.5 days, at least 4 days, at least 5 days, at least 6 days, at least 7 days, at least 8 days, at least 9 days, at least 10 days, at least 20 days, at least 4 weeks, at least 2 months, at least 3 months, at least 4 months, at least 5 months, at least 6 months, at least 7 months, at least 8 months, at least 9 months, at least 10 months, at least 11 months, at least 1 year, at least 1.5 years, at least 2 years, at least 3 years, at least 4 years, at least 5 years, or at least 10 years.

In some embodiments, the composition contained in the aerosol dispensing container is stored at a pressure of about 2 atm to about 200 atm. For example, the composition contained in the aerosol dispensing container is stored at a pressure of about 2 atm to about 160 atm, about 2 atm to about 120 atm, about 2 atm to about 100 atm, about 2 atm to about 90 atm, about 2 atm to about 60 atm, about 2 atm to about 40 atm, about 2 atm to about 20 atm, about 2 atm to about 10 atm, about 10 atm to about 200 atm, about 30 atm to about 200 atm, about 50 atm to about 200 atm, about 70 atm to about 200 atm, about 90 atm to about 200 atm, about 120 atm to about 200 atm, about 150 atm to about 200 atm, about 10 atm to about 160 atm, about 30 atm to about 160 atm, about 60 atm to about 120 atm, about 10 atm to about 100 atm, or about 30 atm to about 90 atm. For example, the composition contained in the aerosol dispensing container is stored at a pressure of about 2 atm, about 3.5 atm, about 10 atm, about 20 atm, about 30 atm, about 40 atm, about 50 atm, about 60 atm, about 70 atm, about 80 atm, about 90 atm, about 100 atm, about 110 atm, about 120 atm, about 130 atm, about 140 atm, about 150 atm, about 160 atm, about 170 atm, about 180 atm, about 190 atm, or about 200 atm.

In some embodiments, the inside of the aerosol dispensing container is lined with an inert polymer.

In some embodiments, the inside of the aerosol dispensing container is substantially free of transition metals (e.g., the inside of the container includes no transition metals). For example, the inside of the container is substantially free of salts and complexes that contain transition metals. In certain embodiments, the inside of the container is substantially free of chromium, manganese, copper, iron, cobalt, zinc, silver, and/or mercury. For example, the inside of the container is substantially free of chromium. For example, the inside of the container is substantially free of manganese. For example, the inside of the container is substantially free of copper. For example, the inside of the container is substantially free of iron. For example, the inside of the container is substantially free of cobalt. For example, the inside of the container is substantially free of zinc. For example, the inside of the container is substantially free of silver. For example, the inside of the container is substantially free of mercury.

In some embodiments, the aerosol dispensing container is comprised of metal (e.g., steel or aluminum).

In some embodiments, the aerosol dispensing container comprises an outlet valve that the composition is dispensed through. In some of these embodiments, the aerosol dispensing container further comprises a nozzle. In certain of these embodiments, activation of the nozzle (e.g., depression or push-down of the nozzle) opens the outlet valve to dispense the composition.

Methods

In another aspect, herein is disclosed a method of preserving the freshness of a plant, comprising contacting the plant with any composition as described herein.

In some embodiments, the contacting comprises spraying the composition on the plant.

In some embodiments, the contacting occurs before harvest of the plant by contacting (e.g., spraying) the composition on the plant. For example, the composition is sprayed on a field or an orchard. In some other embodiments, the contacting occurs after harvest of the plant. For example, the composition is sprayed on plants stored inside a room, a chamber, a container, or a truck. In some of these embodiments, the plants are packaged inside, e.g., boxes, baskets, hampers, palletized containers, cartons, lugs, flats, crates, bags, sacks, clamp shell containers, and/or bulk bins. In some of these embodiments, the packaging is vented. In some other of these embodiments, the packaging is airtight.

In some embodiments, the plant is a fruit or vegetable. For example, the plant is a fruit. For example, the fruit is a banana, an apple, a pear, a peach, a plum, a melon (e.g., cantaloupe, honeydew, or watermelon), an orange, a grape, a strawberry, a blueberry, a kiwifruit, an apricot, a mango, a nectarine, a papaya, a plum, a persimmon, a lime, or a pineapple. For example, the fruit is a banana, a peach, a grape, a strawberry, or a blueberry. For example, the plant is a vegetable. For example, the vegetable is a tomato, an onion, a cucumber, an avocado, a broccoli, a carrot, a gherkin, a cabbage, a turnip, an eggplant, an aubergine, a chili, a pepper, lettuce, chicory, spinach, or garlic. For example, the vegetable is a tomato.

In some embodiments, the plant is a flower. For example, the flower is a rose, carnation, tulip, daisy, sunflower, daffodil, orchid, iris, lilac, gardenia, jasmine, magnolia, hyacinth, or lily of the valley.

In another aspect, herein is disclosed a method of packaging a plant, comprising:

placing the plant inside a chamber;

adding any composition as described herein to the inside of the chamber, wherein the composition is a gas; and packaging the plant inside the chamber.

In some of these embodiments, the packaging is selected from the group consisting of boxes, baskets, hampers, palletized containers, cartons, lugs, flats, crates, bags, sacks, clamp shell containers, and/or bulk bins. In some of these embodiments, the packaging is vented. In some other of these embodiments, the packaging is airtight.

In some embodiments, the plant is a fruit or vegetable. For example, the plant is a fruit. For example, the fruit is a banana, an apple, a pear, a peach, a plum, a melon (e.g., cantaloupe, honeydew, or watermelon), an orange, a grape, a strawberry, a blueberry, a kiwifruit, an apricot, a mango, a nectarine, a papaya, a plum, a persimmon, a lime, or a pineapple. For example, the fruit is a banana, a peach, a grape, a strawberry, or a blueberry. For example, the plant is a vegetable. For example, the vegetable is a tomato, an onion, a cucumber, an avocado, a broccoli, a carrot, a gherkin, a cabbage, a turnip, an eggplant, an aubergine, a chile, a pepper, lettuce, chicory, spinach, or garlic. For example, the vegetable is a tomato.

In some embodiments, the plant is a flower. For example, the flower is a rose, carnation, tulip, daisy, sunflower, daffodil, orchid, iris, lilac, gardenia, jasmine, magnolia, hyacinth, or lily of the valley.

In another aspect, herein is disclosed a method of storing 1-methylcyclopropene, comprising:

adding 1-methylcyclopropene to a container;

adding a stabilizer to the container;

wherein the concentration of the 1-methylcyclopropene does not change substantially after at least one day;

with the proviso that the 1-methylcyclopropene is not complexed to another molecule.

In some embodiments, the stabilizer is as defined previously herein. In some embodiments, the amount of the 1-methylcyclopropene is as defined previously herein. In some embodiments, the amount of the stabilizer is as defined previously herein.

In some embodiments, the concentration of the 1-methylcyclopropene does not change substantially after at least 4 hours. For example, the concentration of the 1-methylcyclopropene does not change substantially after at least 4 hours, at least 8 hours, at least 12 hours, at least 16 hours, at least 20 hours, at least 24 hours, at least 28 hours, at least 32 hours, at least 36 hours, at least 40 hours, at least 44 hours, at least 48 hours, at least 2.5 days, at least 3 days, at least 3.5 days, at least 4 days, at least 5 days, at least 6 days, at least 7 days, at least 8 days, at least 9 days, at least 10 days, at least 20 days, at least 4 weeks, at least 2 months, at least 3 months, at least 4 months, at least 5 months, at least 6 months, at least 7 months, at least 8 months, at least 9 months, at least 10 months, at least 11 months, at least 1 year, at least 1.5 years, at least 2 years, at least 3 years, at least 4 years, at least 5 years, or at least 10 years.

In some embodiments, the composition comprises substantially no water (e.g., the composition comprises no water). In some embodiments, the composition comprises less than 5% by weight of water. For example, the composition comprises less than 4%, less than 3%, less than 2%, less than 1%, less than 0.5%, or less than 0.1% by weight of water. In some embodiments (when the composition is in the form of a gas), the humidity of the gas is less than 100%. For example, the humidity of the gas is less than 90%, less than 80%, less than 50%, less than 30%, less than 20%, less than 10%, less than 5%, less than 2%, or less than 1%.

In some embodiments, the container is a canister. In some other embodiments, the container is a tank. In some embodiments, the container is a gas cylinder. In some embodiments, the container is a flask. In some embodiments, the container is a bag. In embodiments, the container is affixed with a valve that enables passage of the composition in or out of the container. In some embodiments, the container comprises aluminum. In some embodiments, the container comprises steel. In some embodiments, the container is lined with an inert polymer. In some embodiments, the inside of the container is substantially free of transition metals (e.g., the inside of the container includes no transition metals). For example, the inside of the container is substantially free of salts and complexes that contain transition metals. In certain embodiments, the inside of the container is substantially free of chromium, manganese, copper, iron, cobalt, zinc, silver, and/or mercury. For example, the inside of the container is substantially free of chromium. For example, the inside of the container is substantially free of manganese. For example, the inside of the container is substantially free of copper. For example, the inside of the container is substantially free of iron. For example, the inside of the container is substantially free of cobalt. For example, the inside of the container is substantially free of zinc. For example, the inside of the container is substantially free of silver. For example, the inside of the container is substantially free of mercury.

In some embodiments (when the container is a bag), the bag is inside a metal canister, a metal tank, or a metal cylinder. In some embodiments (when the container is a bag inside a metal canister, metal tank, or metal cylinder), the bag is affixed with a valve that opens and closes the bag. In some of these embodiments, the composition can be released from the bag by pushing air inside the metal canister, metal tank, or metal cylinder thereby releasing the composition from the bag.

In another aspect, herein is disclosed a method of storing 1-methylcyclopropene, comprising cooling 1-methylcyclopropene to a temperature of less than −40° C., wherein less than 10% of the 1-methylcyclopropene decomposes after one day.

In some embodiments, the 1-methylcyclopropene is cooled to a temperature of less than −50° C., less than −60° C., less than −70° C., less than −80° C., less than −90° C., less than −100° C., less than −110° C., less than −120° C., less than −130° C., less than −140° C., less than −150° C., less than −160° C., less than −170° C., less than −180° C., or less than −190° C. In some embodiments, the 1-methylcyclopropene is cooled to a temperature of about −78° C. or about −195° C.

In some embodiments, less than 10% of the 1-methylcyclopropene decomposes after one day. For example, less than 9%, less than 8%, less than 7%, less than 6%, less than 5%, less than 4%, less than 3%, less than 2%, less than 1%, less than 0.5%, or less than 0.1% of the 1-methylcyclopropene decomposes after one day.

In some embodiments, less than 10% of the 1-methylcyclopropene decomposes after one day. For example, less than 10% of the 1-methylcyclopropene decomposes after two days, three days, five days, 1 week, 2 weeks, 4 weeks, 2 months, 3 months, 4 months, 5 months, 6 months, 7 months, 8 months, 9 months, 1 year, 1.5 years, or 2 years.

In another aspect, herein is disclosed a method of enhancing the health of a plant, comprising applying any composition as disclosed herein to the plant.

In another aspect, herein is disclosed a method of preparing 1-methylcyclopropene, comprising:

reacting a base with 3-chloro-2-methylpropene to form 1-methylcyclopropene; and condensing the 1-methylcyclopropene at a temperature of less than −40° C.

In some embodiments, the base is sodium amide, potassium amide, sodium hydride, potassium hydride, n-butyllithium, phenyllithium, lithium diisopropylamide, lithium diethylamide, lithium bis(trimethylsilyl)amide, sodium bis(trimethylsilyl)amide, potassium bis(trimethylsilyl)amide. In some embodiments, the base is sodium amide.

In some embodiments, the 1-methylcyclopropene is condensed at a temperature of less than −50° C., less than −60° C., or less than −70° C. In some embodiments, the 1-methylcyclopropene is condensed at a temperature of about −78° C.

In some embodiments, the reacting is performed in a solvent (e.g., toluene or benzene). For example, the reacting is performed in toluene.

In some embodiments, the concentration of the base in the solvent is from about 0.1 to about 5 g/mL. For example, from about 0.1 to about 0.5 g/mL, from about 0.5 to about 1 g/mL, from about 1 g/mL to about 2 g/mL, from about 2 g/mL to about 3 g/mL, from about 3 g/mL to about 4 g/mL, from about 4 g/mL to about 5 g/mL, from about 0.5 g/mL to about 2 g/mL, about 0.5 g/mL, about 1 g/mL, or about 2 g/mL.

In some embodiments, the reacting comprises adding the 3-chloro-2-methylpropene to the base. In some of these embodiments, the reacting comprises adding the 3-chloro-2-methylpropene dropwise to the base. In some embodiments, the molar ratio of 3-chloro-2-methylpropene to the base is 2:1. In some embodiments, from about 0.3 to about 5 molar equivalents of the base is used with respect to the 3-chloro-2-methylpropene. For example, from about 0.3 to about 3 molar equivalents, from about 0.67 to about 2 molar equivalents, from about 0.67 to about 1 molar equivalents, from about 1 to about 2 molar equivalents, about 0.67 molar equivalents, about 1 molar equivalent, about 1.5 molar equivalents, or about 2 molar equivalents of the base is used with respect to the 3-chloro-2-methylpropene.

In some embodiments, after the reacting, the 1-methylcyclopropene is passed through an acid (e.g., sulfuric acid) and/or water. For example, after the reacting, the 1-methylcyclopropene is passed through an acid (e.g., sulfuric acid) then water.

In some embodiments, the condensing comprises collecting the 1-methylcyclopropene in a vessel (e.g., a glass vessel) cooled to less than −40° C. (e.g., less than −50° C., less than −60° C., less than −70° C., or about −78° C.) In some embodiments, the condensing comprises passing the 1-methylcyclopropene through a glass-filled condenser system before collecting the 1-methylcyclopropene in the vessel (e.g., a glass vessel).

In another aspect, herein is disclosed a method of preparing any composition as disclosed herein, comprising:

condensing 1-methylcyclopropene at a temperature of less than −40° C. into a vessel containing a stabilizer.

In some embodiments, the stabilizer is as defined previously herein. In some embodiments, the amount of the 1-methylcyclopropene is as defined previously herein. In some embodiments, the amount of the stabilizer is as defined previously herein. In some embodiments, other features of the composition are as described anywhere herein.

In some embodiments, the method further comprises reacting a base with 3-chloro-2-methylpropene to form the 1-methylcyclopropene before condensing the 1-methylcyclopropene.

In some embodiments, the base is sodium amide, potassium amide, sodium hydride, potassium hydride, n-butyllithium, phenyllithium, lithium diisopropylamide, lithium diethylamide, lithium bis(trimethylsilyl)amide, sodium bis (trimethylsilyl)amide, potassium bis(trimethylsilyl)amide. In some embodiments, the base is sodium amide.

In some embodiments, the 1-methylcyclopropene is condensed at a temperature of less than −50° C., less than −60° C., or less than −70° C. In some embodiments, the 1-methylcyclopropene is condensed at a temperature of about −78° C.

In some embodiments, the reacting is performed in toluene or benzene. For example, the reacting is performed in toluene.

In some embodiments, the reacting comprises adding the 3-chloro-2-methylpropene to the base. In some of these embodiments, the reacting comprises adding the 3-chloro-2-methylpropene dropwise to the base.

In some embodiments, after the reacting, the 1-methylcyclopropene is passed through an acid (e.g., sulfuric acid) and/or water. For example, after the reacting, the 1-methylcyclopropene is passed through an acid (e.g., sulfuric acid) then water.

In some embodiments, the condensing comprises collecting the 1-methylcyclopropene in a vessel (e.g., a glass vessel) cooled to less than −40° C. (e.g., less than −50° C., less than −60° C., less than −70° C., or about −78° C.) In some embodiments, the condensing comprises passing the 1-methylcyclopropene through a glass-filled condenser system before collecting the 1-methylcyclopropene in the vessel (e.g., a glass vessel).

The invention will now be described further by way of the following examples.

Example 1

Preparation of 1-Methylcyclopropene

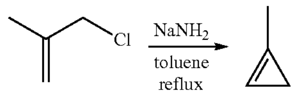

Toluene (300-2000 ml) and sodium amide (20 g-180 g; from about 0.67 to about 2 molar equivalents with respect to 3-chloro-2-methylpropene and about 0.75 g/mL concentration in toluene) were placed under argon in a reactor (capacity of 1-6 liters) equipped with an efficient condenser and airtight stirrer. After bringing the mixture to reflux, 2-200 ml of 3-chloro-2-methylpropene was added dropwise until all the 3-chloro-2-methylpropene was consumed. The escaping gases were allowed to pass through sulfuric acid to remove ammonia. Then, the gaseous 1-MCP was passed through a scrubber filled with water. The 1-MCP was then passed through a glass-filled condenser system and collected by condensation in a glass vessel cooled to −78° C. (by immersion in a dry ice/acetone bath). The liquid 1-methylcyclopropene was expanded into a gas in a 500 mL Tedlar bag.

To a 250 mL amber glass bottle fitted with a gas-tight valve flushed with nitrogen was added 250 μL of cis-2-butene and 250 μL of the 1-methylcyclopropene gas as obtained from the Tedlar bag. This mixture was analyzed by gas chromatography (GC) to test the concentration of the 1-methylcyclopropene in order to determine its stability in the presence of cis-2-butene. Cis-2-butene also functions as a reference in GC because it has the same response from an FID detector as 1-methylcyclopropene. 250 μL of the 1-methylcyclopropene and cis-2-butene mixture was collected with a gas-tight syringe and injected into the gas chromatograph. The gas chromatograph was equipped with a PoraBOND Q column: 25 m×0.25 5 mm internal diameter (i.d.)×3 μm and a flame ionization detector (FID). The following conditions were used: temperature of the split/splitless injector 120° C.; isothermal 120° C., temperature of the FID 240° C. detector, split 20:1, carrier gas flow (helium) 50 cm/s.

Liquid Compositions

Example 2

1-MCP formed by the synthetic procedure described in Example 1 was condensed into a vessel in which liquid propellant had previously been placed. Then, cis-2-butene was condensed into the vessel.

The resulting composition included 10% by weight of the 1-methylcyclopropene and 0.5% by weight of cis-2-butene (5% in relation to 1-MCP). The liquid propellant was a mixture of propane and butane.

Figure 1:
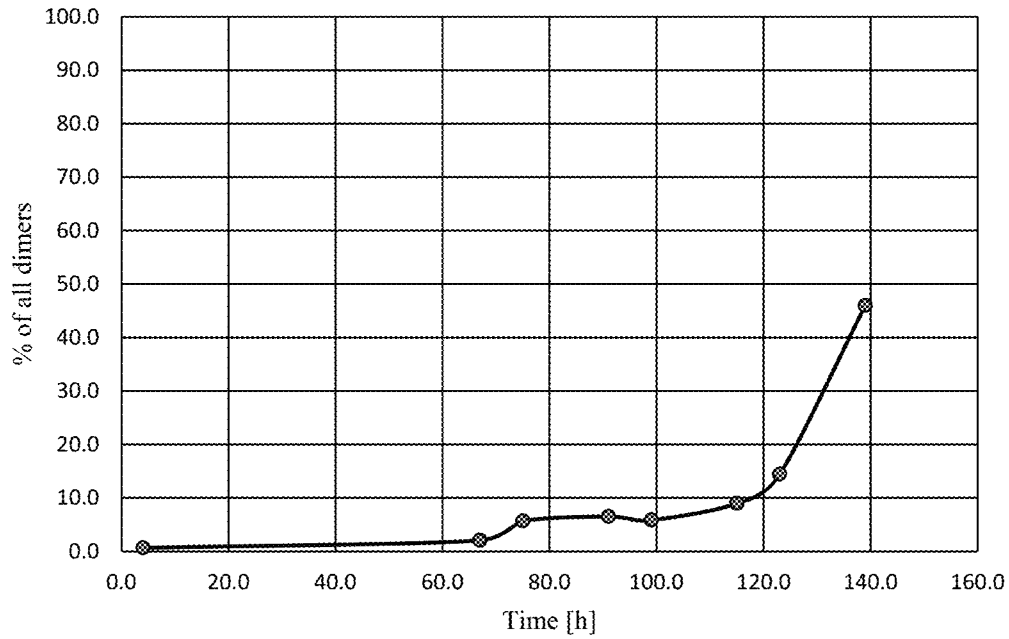
FIG. 1. is a plot of the percentage of dimers measured by GC at points over time in a composition including 10% by weight of 1-MCP, 5% by weight of cis-2-butene (in relation to 1-MCP), propane, and butane.

The weight percentage of dimers in the sample (which are products of 1-MCP decomposition) was measured by gas chromatography at various points over time. Results are shown in Table 1 and FIG. 1.

TABLE 1

Weight percentage of dimers in sample as a function of time

| Time [h] | % of dimer |
|---|---|
| 4.0 | 0.654 |
| 67.0 | 2.058 |
| 75.0 | 5.682 |
| 91.0 | 6.510 |
| 99.0 | 5.871 |
| 115.0 | 8.953 |
| 123.0 | 14.440 |
| 139.0 | 46.003 |

Example 3

A composition including 10% by weight of 1-methylcyclopropene, 0.7% by weight of cis-2-butene (7% in relation to 1-MCP), and 89.3% by weight of a mixture of propane and butane was prepared.

Figure 2:
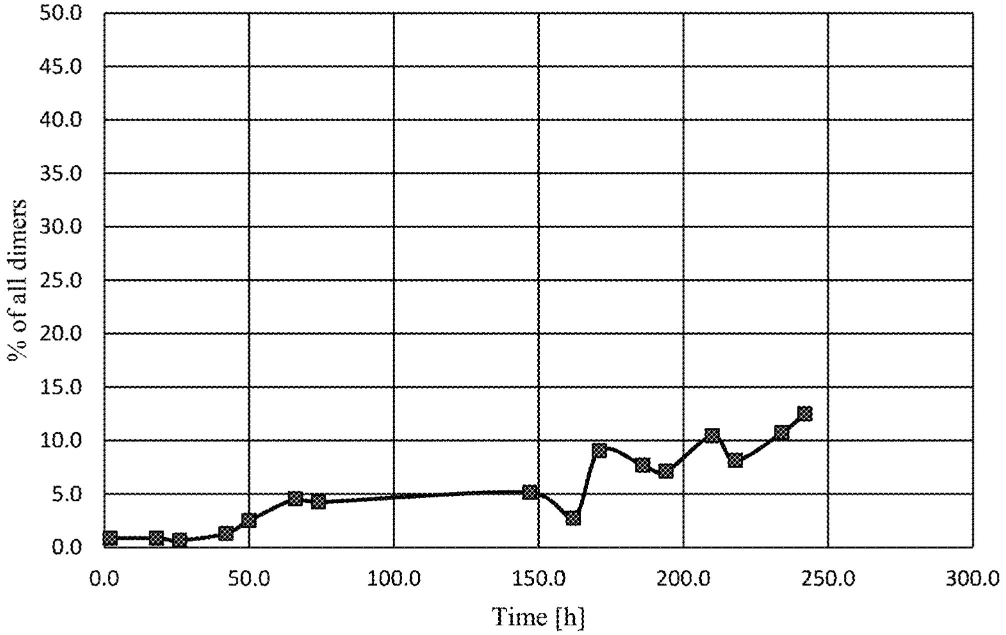
FIG. 2 is a plot of the percentage of dimers measured by GC at points over time in a composition including 10% by weight of 1-MCP, 7% by weight of cis-2-butene (in relation to 1-MCP), and 83% by weight of propane and butane.

The percentage of dimers in the sample was measured by gas chromatography at various points over time. Results are shown in Table 2 and FIG. 2. As can be seen, increasing the amount of cis-2-butene to 7% (from 5% as described in Example 2) slowed the rate of dimer formation.

TABLE 2

Percentage of dimers in sample as a function of time

| Time [h] | % of dimer |
|---|---|
| 2.0 | 0.872 |
| 18.0 | 0.865 |
| 26.0 | 0.660 |
| 42.0 | 1.308 |
| 50.0 | 2.512 |
| 66.0 | 4.556 |

TABLE 2-continued

| Percentage of dimers in sample as a function of time | |
|---|---|
| Time [h] | % of dimer |
| 74.0 | 4.250 |
| 147.0 | 5.150 |
| 162.0 | 2.746 |
| 171.0 | 9.048 |
| 186.0 | 7.697 |
| 194.0 | 7.132 |
| 210.0 | 10.441 |
| 218.0 | 8.143 |
| 234.0 | 10.739 |
| 242.0 | 12.498 |

Example 4

A composition including 10% by weight of 1-methylcyclopropene, 0.3% by weight of cis-2-butene (3% in relation to 1-MCP), and isobutane was prepared.

Figure 3:
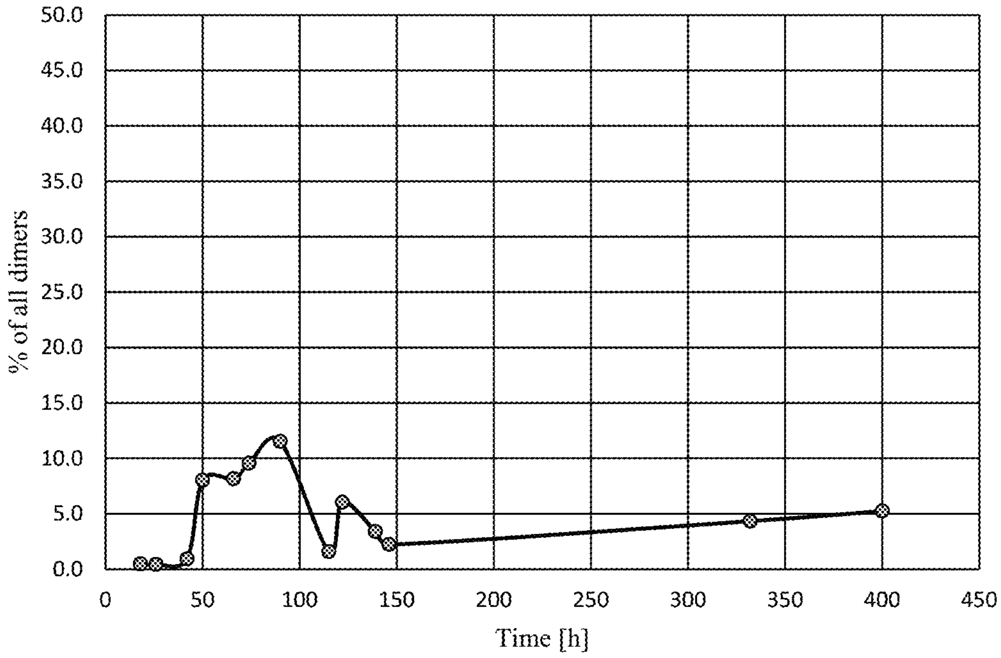
FIG. 3 is a plot of the percentage of dimers measured by GC at points over time in a composition including 10% by weight of 1-MCP, 3% by weight of cis-2-butene (in relation to 1-MCP), and isobutane.

The percentage of dimers in the sample was measured by gas chromatography at various points over time. Results are shown in Table 3 and FIG. 3.

TABLE 3

| Percentage of dimers in sample as a function of time | |
|---|---|
| Time [h] | % of dimer |
| 18.0 | 0.488 |
| 26.0 | 0.439 |
| 42.0 | 0.937 |
| 50.0 | 8.030 |
| 66.0 | 8.165 |
| 74.0 | 9.563 |
| 90.0 | 11.522 |
| 115.0 | 1.588 |
| 122.0 | 6.040 |
| 139.0 | 3.403 |
| 146.0 | 2.237 |
| 332.0 | 4.334 |
| 400.0 | 5.254 |

Example 5

A composition comprising 5% by weight of the 1-methylcyclopropene, 0.15% by weight of cis-2-butene (3% in relation to 1-MCP), and isobutane.

Figure 4:
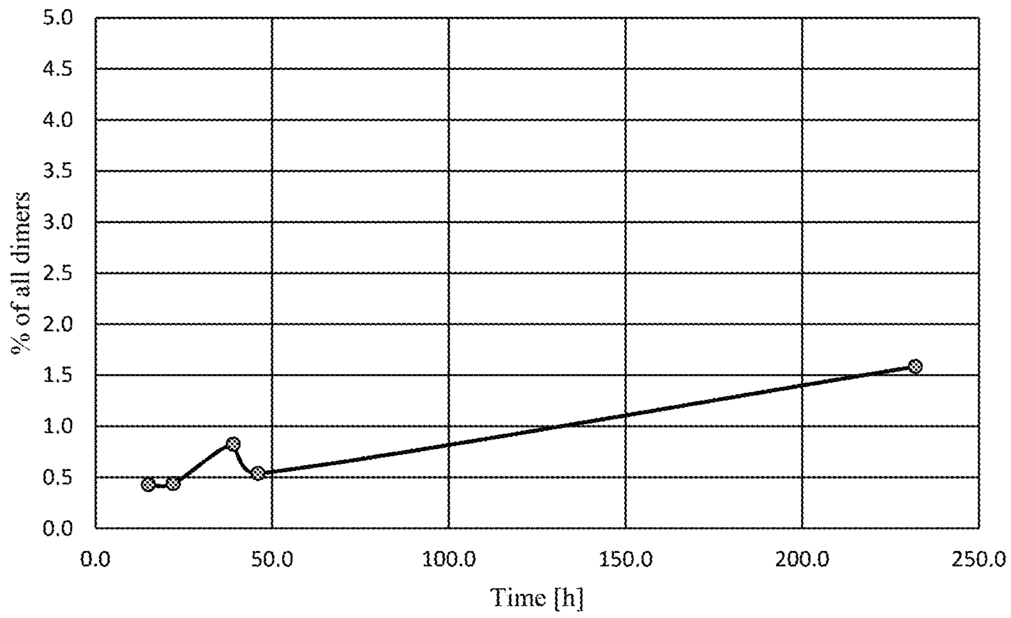
FIG. 4 is a plot of the percentage of dimers measured by GC at points over time in a composition including 5% by weight of 1-MCP, 3% by weight of cis-2-butene (in relation to 1-MCP), and isobutane.

The percentage of dimers in the sample was measured by gas chromatography at various points over time. Results are shown in Table 4 and FIG. 4.

TABLE 4

| Percentage of dimers in sample as a function of time. | |
|---|---|
| Time [h] | % of dimer |
| 15.00 | 0.429 |
| 22.00 | 0.439 |
| 39.00 | 0.824 |
| 46.00 | 0.538 |
| 232.00 | 1.584 |

Gaseous Compositions

Example 6

1-MCP formed by the synthetic procedure described in Example 1 was expanded (i.e., permitted to change into a gas) into a glass container with a gas-tight valve and supplemented with a suitable gas (e.g., nitrogen, oxygen, carbon dioxide, and/or argon) and stabilizer.

The composition included 1-MCP, cis-2-butene, and carbon dioxide. The concentration of 1-MCP and cis-2-butene were each 0.1% volume/volume.

Figure 5:
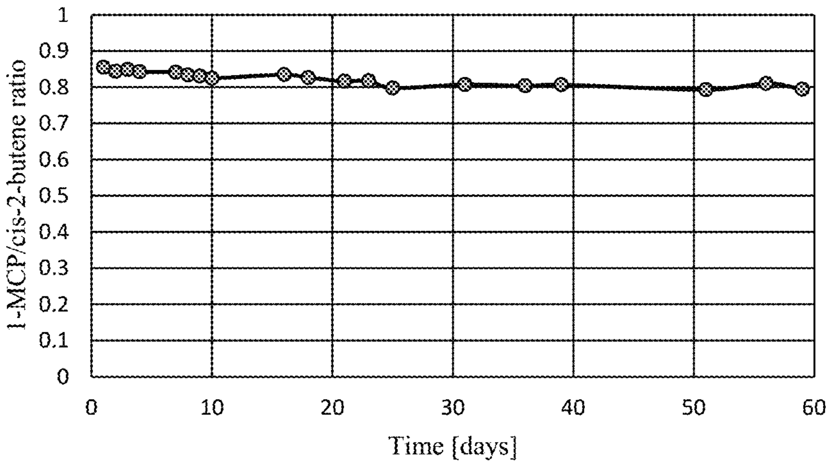
FIG. 5 is a plot of the ratio of peak areas of 1-MCP:cis-2-butene at points over time in a composition including 0.1% volume/volume of 1-MCP, 0.1% volume/volume of cis-2-butene, and carbon dioxide.

Table 5 and FIG. 5 show the change in the peak area ratio of 1-MCP:cis-2-butene as measured by gas chromatography at various points over time. Table 6 compares the peak ratio at the first measurement (day 1) to the day 59 measurement, showing substantially no change in the concentration of the 1-MCP after 59 days.

TABLE 5

| Ratio of GC peak areas of l-MCP:cis-2-butene as a function of time in presence of carbon dioxide | |
|---|---|
| Day | 1-MCP/cis-2-butene peak areas ratio |
| 1 | 0.8553 |
| 2 | 0.8441 |
| . | . |
| . | . |
| . | . |
| 8 | 0.8339 |
| . | . |
| . | . |
| . | . |
| 16 | 0.8348 |
| . | . |
| . | . |
| . | . |
| 23 | 0.8182 |
| . | . |
| . | . |
| . | . |
| 36 | 0.8040 |
| 39 | 0.8070 |
| . | . |
| . | . |
| . | . |
| 56 | 0.8105 |
| 59 | 0.7945 |

TABLE 6

| Change in concentration of 1-MCP after 59 days | |
|---|---|
| Day | % of 1-MCP |
| 1 | 100.0 |
| 59 | 92.90 |

Example 7

1-MCP formed by the synthetic procedure described in Example 1 was expanded (i.e., permitted to change into a gas) into a glass container with a gas-tight valve and supplemented with a suitable gas and stabilizer.

The composition included 1-MCP, cis-2-butene, and nitrogen (250 mL). The concentration of 1-MCP and cis-2-butene were each 0.1% volume/volume.

Figure 6:
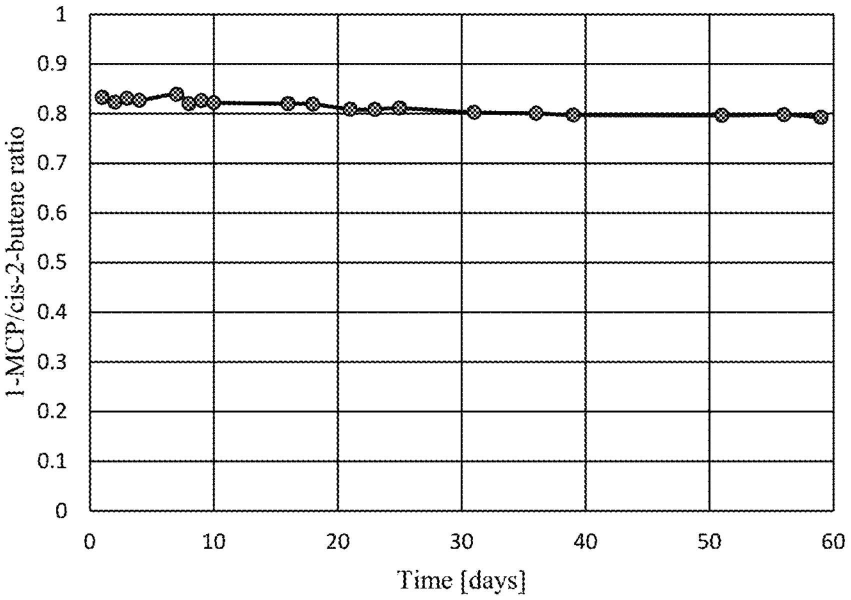
FIG. 6 is a plot of the ratio of peak areas of 1-MCP:cis-2-butene at points in time over 59 days in a composition including 0.1% volume/volume of 1-MCP, 0.1% volume/volume of cis-2-butene, and nitrogen.

Table 7 and FIG. 6 show the change in the peak area ratio of 1-MCP:cis-2-butene as measured by gas chromatography at various points over time. Table 8 compares the peak ratio at the first measurement (day 1) to the day 59 measurement, showing substantially no change in the concentration of the 1-MCP after 59 days.

TABLE 7

Ratio of GC peak areas of l-MCP:cis-2-butene as a function of time in presence of nitrogen

| Day | 1-MCP/cis-2-butene peak areas ratio |
|---|---|
| 1 | 0.8326 |
| 2 | 0.8230 |
| . | . |
| . | . |
| . | . |
| 8 | 0.8199 |
| . | . |
| . | . |
| . | . |
| 16 | 0.8201 |
| . | . |
| . | . |
| . | . |
| 23 | 0.8088 |
| . | . |
| . | . |
| . | . |
| 36 | 0.8006 |
| 39 | 0.7974 |
| . | . |
| . | . |
| . | . |
| 56 | 0.7979 |
| 59 | 0.7925 |

TABLE 8

Change in concentration of 1-MCP after 59 days

| Day | % of 1-MCP |
|---|---|
| 1 | 100.0 |
| 59 | 95.17 |

Example 8

1-MCP formed by the synthetic procedure described in Example 1 was expanded (i.e., permitted to change into a gas) into a glass container with a gas-tight valve and supplemented with a suitable gas and stabilizer.

The composition included 1-MCP, cis-2-butene, and nitrogen. The concentration of 1-MCP and cis-2-butene were each 0.1% volume/volume.

Figure 7:
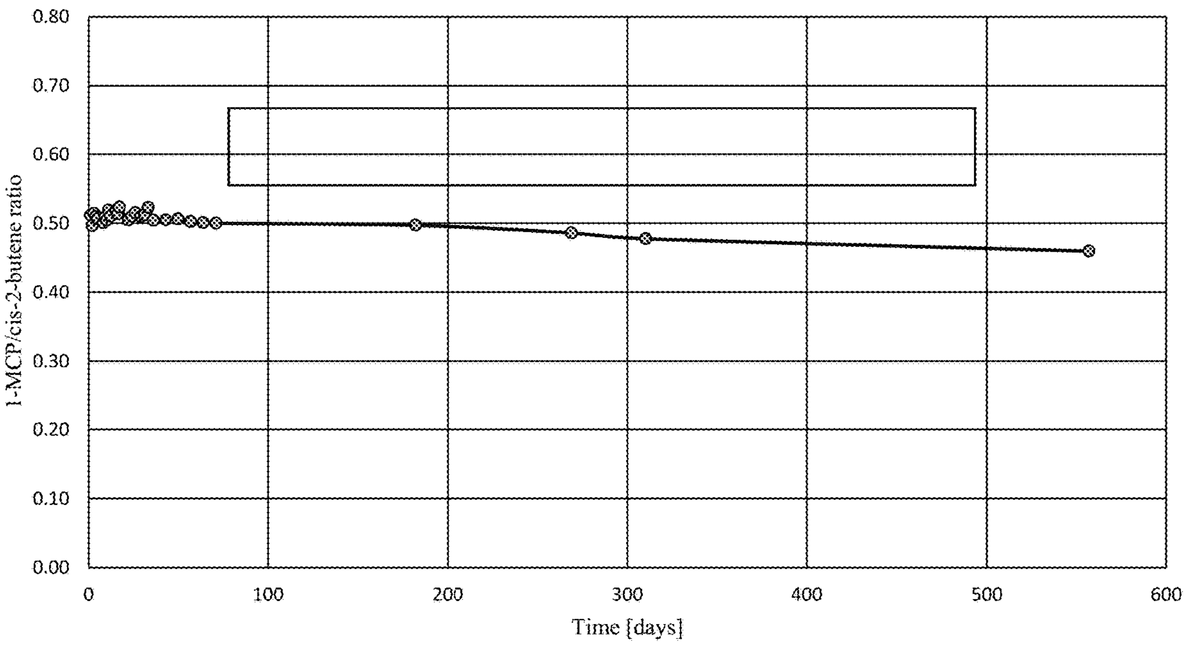
FIG. 7 is a plot of the ratio of peak areas of 1-MCP:cis-2-butene at points in time over 182 days in a composition including 0.1% volume/volume of 1-MCP, 0.1% volume/volume of cis-2-butene, and nitrogen.

Table 9 and FIG. 7 show the change in the peak area ratio of 1-MCP:cis-2-butene as measured by gas chromatography at various points over time. Table 10A compares the peak ratio at the first measurement (day 1) to the day 182 measurement, showing substantially no change in the concentration of the 1-MCP after 182 days. Table 10B compares the peak ratio at the first measurement (day 1) to the day 557 measurement, showing little change in the concentration of the 1-MCP after 557 days.

TABLE 9

Ratio of GC peak areas of l-MCP:cis-2-butene as a function of time in presence of nitrogen

| Day | 1-MCP/cis-2-butene peak areas ratio |
|---|---|
| 1 | 0.5115 |
| 2 | 0.4964 |
| . | . |
| . | . |
| . | . |
| 9 | 0.5085 |
| . | . |
| . | . |
| . | . |
| 16 | 0.5133 |
| . | . |
| . | . |
| . | . |
| 24 | 0.5097 |
| . | . |
| . | . |
| . | . |
| 31 | 0.5117 |
| . | . |
| . | . |
| . | . |
| 43 | 0.5046 |
| 50 | 0.5062 |
| 57 | 0.5024 |
| 64 | 0.5007 |
| 71 | 0.5001 |
| 182 | 0.4969 |
| 269 | 0.4859 |
| 310 | 0.4775 |
| 557 | 0.4594 |

TABLE 10A

Change in concentration of 1-MCP after 182 days

| Day | % of 1-MCP |
|---|---|
| 1 | 100.0 |
| 182 | 97.15 |

TABLE 10B

Change in concentration of 1-MCP after 557 days

| Day | % of 1-MCP |
|---|---|
| 1 | 100.0 |
| 557 | 89.82 |

Example 9

1-MCP formed by the synthetic procedure described in Example 1 was expanded (i.e., permitted to change into a gas) into a glass container with a gas-tight valve and supplemented with a suitable gas and stabilizer.

The composition included 1-MCP, cis-2-butene, and nitrogen. The concentration of 1-MCP and cis-2-butene were each 5% volume/volume.

Figure 8:
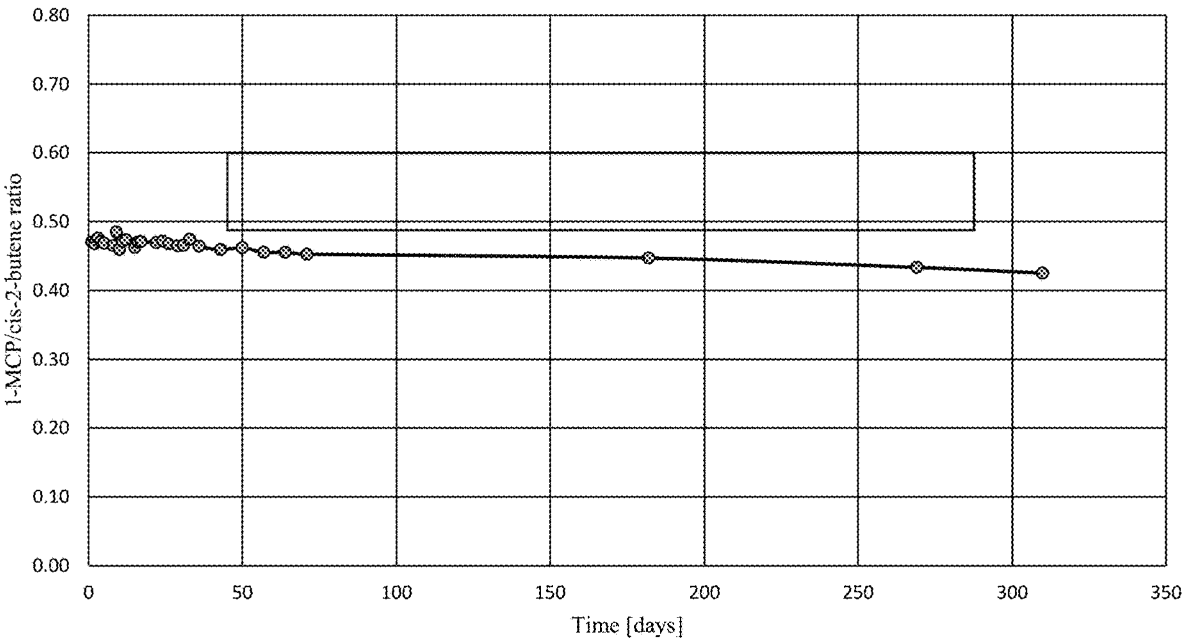
FIG. 8 is a plot of the ratio of peak areas of 1-MCP:cis-2-butene at points over time in a composition including 5% volume/volume of 1-MCP, 5% volume/volume of cis-2-butene, and nitrogen.

Table 11 and FIG. 8 show the change in the peak area ratio of 1-MCP:cis-2-butene as measured by gas chromatography at various points over time. Table 12A compares the peak ratio at the first measurement (day 1) to the day 182 measurement, showing substantially no change in the concentration of the 1-MCP after 182 days. Table 12B compares the peak ratio at the first measurement (day 1) to the day 310 measurement, showing substantially no change in the concentration of the 1-MCP after 310 days.

TABLE 11

Ratio of GC peak areas of 1-MCP:cis-2-butene as a function of time in presence of nitrogen

| Day | 1-MCP/cis-2-butene peak areas ratio |
|---|---|
| 1 | 0.4702 |
| 2 | 0.4679 |
| . | . |
| . | . |
| . | . |
| 9 | 0.4848 |
| . | . |
| . | . |
| . | . |
| 16 | 0.4702 |
| . | . |
| . | . |
| . | . |
| 24 | 0.4716 |
| . | . |
| . | . |
| . | . |
| 31 | 0.4654 |
| . | . |
| . | . |
| . | . |
| 43 | 0.4594 |
| 50 | 0.4620 |
| 57 | 0.4554 |
| 64 | 0.4554 |
| 71 | 0.4527 |
| 182 | 0.4472 |
| 269 | 0.4335 |
| 310 | 0.4254 |

TABLE 12A

Change in concentration of 1-MCP after 182 days

| Day | % of 1-MCP |
|---|---|
| 1 | 100.0 |
| 182 | 95.10 |

TABLE 12B

Change in concentration of 1-MCP after 310 days

| Day | % of 1-MCP |
|---|---|
| 1 | 100.0 |
| 310 | 89.34 |

Example 10

1-MCP formed by the synthetic procedure described in Example 1 was expanded (i.e., permitted to change into a gas) into a glass container with a gas-tight valve and supplemented with a suitable gas and stabilizer.

The composition included 1-MCP, cis-2-butene, and nitrogen. The concentration of 1-MCP and cis-2-butene were each 10% volume/volume.

Figure 9:
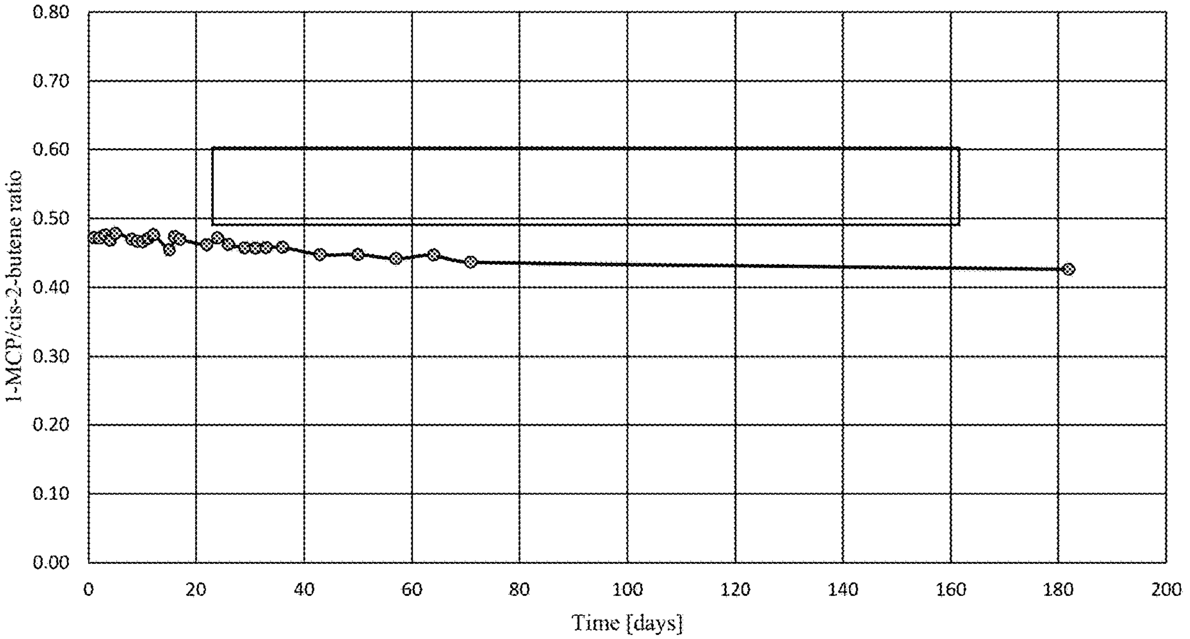
FIG. 9 is a plot of the ratio of peak areas of 1-MCP:cis-2-butene at points over time in a composition including 10% volume/volume of 1-MCP, 10% volume/volume of cis-2-butene, and nitrogen.

Table 13 and FIG. 9 show the change in the peak area ratio of 1-MCP:cis-2-butene as measured by gas chromatography at various points over time. Table 14 compares the peak ratio at the first measurement (day 1) to the day 182 measurement, showing substantially no change in the concentration of the 1-MCP after 182 days.

TABLE 13

Ratio of GC peak areas of 1-MCP:cis-2-butene as a function of time in presence of nitrogen

| Day | 1-MCP/cis-2-butene peak areas ratio |
|---|---|
| 1 | 0.4720 |
| 2 | 0.4714 |
| . | . |
| . | . |
| . | . |
| 9 | 0.4667 |
| . | . |
| . | . |
| . | . |
| 16 | 0.4735 |
| . | . |
| . | . |
| . | . |
| 24 | 0.4717 |
| . | . |
| . | . |
| . | . |
| 31 | 0.4568 |
| . | . |
| . | . |
| . | . |
| 43 | 0.4475 |
| 50 | 0.4477 |
| 57 | 0.4417 |
| 64 | 0.4470 |
| 71 | 0.4366 |
| 182 | 0.4262 |

TABLE 14

Change in concentration of 1-MCP after 182 days

| Day | % of 1-MCP |
|---|---|
| 1 | 100.0 |
| 182 | 90.30 |

Example 11

1-MCP formed by the synthetic procedure described in Example 1 was expanded (i.e., permitted to change into a gas) into a glass container with a gas-tight valve. Cis-2-butene and nitrogen were added.

The resulting composition included 1-MCP, cis-2-butene, and nitrogen. The concentration of 1-MCP was 10% volume/volume and the concentration of cis-2-butene was 0.1% volume/volume (1% in relation to the added volume of 1-MCP).

Figure 10A:
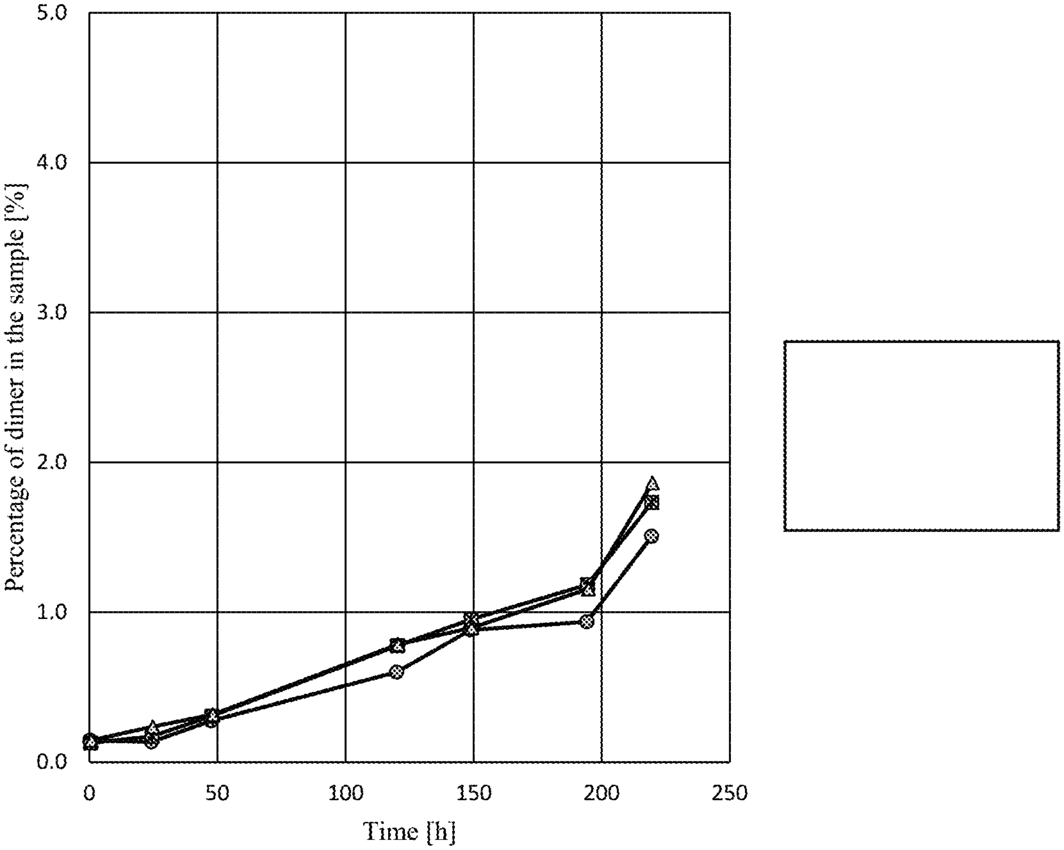
FIG. 10A is an overlay of (1) a plot of the percentage of dimers measured by GC at points over hours in a composition including 10% by weight of 1-MCP, 1% by weight of cis-2-butene (in relation to 1-MCP), and nitrogen; (2) a plot of the percentage of dimers measured by GC at points over hours in a composition including 10% by weight of 1-MCP, 10% by weight of cis-2-butene (in relation to 1-MCP), and nitrogen; and (3) a plot of the percentage of dimers measured by GC at points over hours in a composition including 10% by weight of 1-MCP, 50% by weight of cis-2-butene (in relation to 1-MCP), and nitrogen.
Figure 10B:
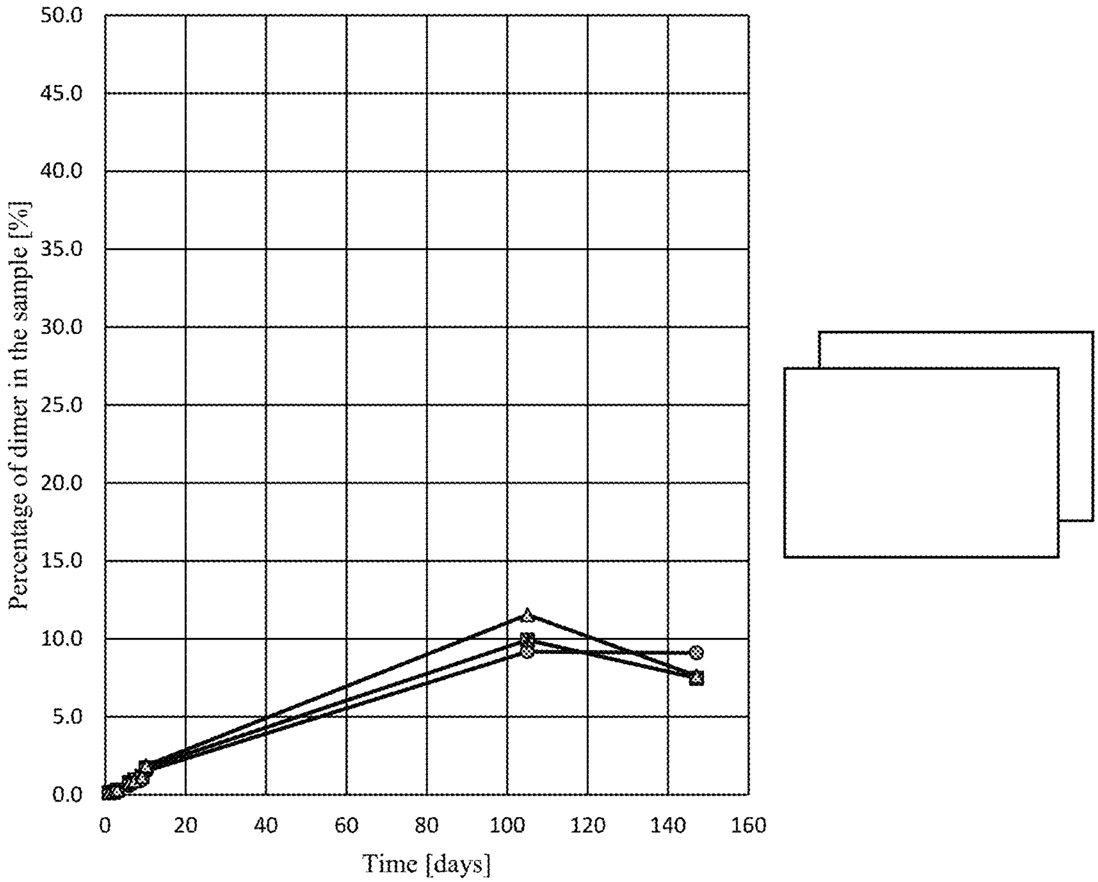
FIG. 10B is an overlay of (1) a plot of the percentage of dimers measured by GC at points over days in a composition including 10% by weight of 1-MCP, 1% by weight of cis-2-butene (in relation to 1-MCP), and nitrogen; (2) a plot of the percentage of dimers measured by GC at points over days in a composition including 10% by weight of 1-MCP, 10% by weight of cis-2-butene (in relation to 1-MCP), and nitrogen; and (3) a plot of the percentage of dimers measured by GC at points over days in a composition including 10% by weight of 1-MCP, 50% by weight of cis-2-butene (in relation to 1-MCP), and nitrogen.

Table 15A and FIG. 10A (plot line with circular data points) show the percentage of dimers in the sample measured by gas chromatography at various points over 219.5 hours. Table 15B and FIG. 10B (plot line with circular data points) shows the percentage of dimers in the sample measured by gas chromatography at various points over 147 days.

TABLE 15A

| Percentage of dimers in sample as a function of time in hours | |
|---|---|
| Time [h] | % of dimer |
| 0.25 | 0.145 |
| 24.25 | 0.135 |
| 47.5 | 0.275 |
| 120 | 0.600 |
| 148.75 | 0.882 |
| 194.25 | 0.936 |
| 219.5 | 1.507 |

TABLE 15B

| Percentage of dimers in sample as a function of time in days | |
|---|---|
| Time [days] | % of dimer |
| 1 | 0.145 |
| 2 | 0.135 |
| 3 | 0.275 |
| 6 | 0.600 |
| 7 | 0.882 |
| 9 | 0.936 |
| 10 | 1.507 |
| 105 | 9.184 |
| 147 | 9.097 |

Example 12

1-MCP formed by the synthetic procedure described in Example 1 was expanded (i.e., permitted to change into a gas) into a glass container with a gas-tight valve. Cis-2-butene and nitrogen were added.

The resulting composition included 1-MCP, cis-2-butene, and nitrogen. The concentration of 1-MCP was 10% volume/volume and the concentration of cis-2-butene was 1% volume/volume (10% in relation to the added volume of 1-MCP).

Table 16A and FIG. 10A (plot line with square data points) show the percentage of dimers in the sample as measured by gas chromatography at various points over 219.5 hours. Table 16B and FIG. 10B (plot line with square data points) shows the percentage of dimers in the sample measured by gas chromatography at various points over 147 days.

TABLE 16A

| Percentage of dimers in sample as a function of time in hours | |
|---|---|
| Time [h] | % of dimer |
| 0.5 | 0.128 |
| 24.5 | 0.172 |
| 47.75 | 0.307 |
| 120.25 | 0.777 |
| 149 | 0.952 |
| 194.5 | 1.184 |
| 219.5 | 1.732 |

TABLE 16B

| Percentage of dimers in sample as a function of time in days | |
|---|---|
| Time [days] | % of dimer |
| 1 | 0.128 |
| 2 | 0.172 |
| 3 | 0.307 |
| 6 | 0.777 |
| 7 | 0.952 |
| 9 | 1.184 |
| 10 | 1.732 |
| 105 | 9.930 |
| 147 | 7.479 |

Example 13

1-MCP formed by the synthetic procedure described in Example 1 was expanded (i.e., permitted to change into a gas) into a glass container with a gas-tight valve. Cis-2-butene and nitrogen were added.

The resulting composition included 1-MCP, cis-2-butene, and nitrogen. The concentration of 1-MCP was 10% volume/volume and the concentration of cis-2-butene was 5% volume/volume (50% in relation to the added volume of 1-MCP).

Table 17A and FIG. 10A (plot line with triangular data points) show the percentage of dimers in the as measured by gas chromatography at various points over 219.75 hours. Table 17B and FIG. 10B (plot line with triangular data points) shows the percentage of dimers in the sample measured by gas chromatography at various points over 147 days.

TABLE 17A

| Percentage of dimers in sample as a function of time in hours. | |
|---|---|
| Time [h] | % of dimer |
| 0.75 | 0.146 |
| 24.75 | 0.236 |
| 48.25 | 0.317 |
| 120.5 | 0.786 |
| 149.25 | 0.896 |
| 194.75 | 1.155 |
| 219.75 | 1.864 |

TABLE 17B

| Percentage of dimers in sample as a function of time in hours. | |
|---|---|
| Time [days] | % of dimer |
| 1 | 0.146 |
| 2 | 0.236 |
| 3 | 0.317 |
| 6 | 0.786 |
| 7 | 0.896 |
| 9 | 1.155 |
| 10 | 1.864 |
| 105 | 11.553 |
| 147 | 7.625 |

Example 14

The liquid 1-MCP resulting from the reaction of Example 1 was expanded into a glass container with a gas-tight valve and supplemented with a suitable gas and stabilizer.

1-MCP and butane was mixed in liquid form in 1:1 ratio (v/v). Then, the mixture was transferred into the glass container.

Table 18 and FIG. 11 (plot line with circular data points) show the percentage of dimers in the composition as measured by gas chromatography at various points over time. The dotted line is a trend line that extrapolates the 1-MCP/butane plot. A negative control containing only 1-MCP was used for comparison. Table 19 and FIG. 11 (plot line with square data points) show the percentage of dimers in the negative control as measured by gas chromatography at the same points over time that the composition was measured. Tables 18-19 and FIG. 11 show that the presence of butane significantly decreases the rate of dimer formation, thus stabilizing the 1-MCP. Table 20 shows the percentage of 1-MCP in the sample as a function of time, showing that its concentration does not significantly over time.

TABLE 18

Percentage of dimers in sample as a function of time

| Time [h] | % of dimer |
|---|---|
| 0 | 0.160 |
| 3.25 | 0.546 |
| 5 | 0.335 |
| 23.25 | 0.827 |
| 95.25 | 3.394 |
| 172 | 6.898 |
| 197.25 | 8.438 |
| 1483.25 | 8.421 |

TABLE 19

Percentage of dimers in negative control as a function of time

| Time [h] | % of dimer |
|---|---|
| 1 | 0.229 |
| 3.75 | 0.401 |
| 25.75 | 4.013 |
| 123.5 | 49.588 |

TABLE 20

Percentage of 1-MCP in sample as a function of time

| Time [h] | % of 1-MCP |
|---|---|
| 0 | 44.79 |
| 3.25 | 40.34 |
| 5 | 42.70 |
| 23.25 | 43.19 |
| 95.25 | 42.20 |
| 172 | 38.81 |
| 197.25 | 41.56 |
| 1483.25 | 41.96 |

EXEMPLARY EMBODIMENTS

1. A composition comprising:
   1-methylcyclopropene; and
   a stabilizer;
   wherein the concentration of the 1-methylcyclopropene does not change substantially after at least 4 hours;
   with the proviso that the 1-methylcyclopropene is not complexed to another molecule.
2. The composition of embodiment 1, wherein the stabilizer is selected from the group consisting of: a lower alkane, a lower alkene, a lower dialkyl ether, a lower trialkylamine, and combinations thereof.
3. The composition of any one of embodiments 1-2, wherein the stabilizer comprises cis-2-butene.
4. The composition of any one of embodiments 1-3, wherein the composition comprises from about 0.1% to about 50% by weight of the 1-methylcyclopropene.
5. The composition of any one of embodiments 1-4, wherein the composition comprises from about 0.1% to about 10% by weight of the stabilizer.
6. The composition of any one of embodiments 1-5, wherein the composition is a liquid.
7. The composition of any one of embodiments 1-6, wherein the concentration of the 1-methylcyclopropene does not change substantially after at least 4 weeks.
8. The composition of embodiment 6, further comprising a solvent; and
   at least one component selected from the group consisting of: a polymer, a plasticizer, a surfactant, and an adjuvant.
9. The composition of any one of embodiments 1-5 and 7, wherein the composition is a gas and further comprises nitrogen, oxygen and carbon dioxide.
10. The composition of embodiment 9, wherein the composition comprises from about 1% to about 10% by weight of the 1-methylcyclopropene.
11. The composition of embodiment 9, wherein the composition comprises from about 1% to about 10% by volume of the 1-methylcyclopropene.
12. The composition of any one of embodiments 9-10, wherein the composition comprises from about 80% to about 94% by weight of the nitrogen; from about 3% to about 10% by weight of the oxygen; and from about 3% to about 10% by weight of the carbon dioxide.
13. The composition of any one of embodiments 9 and 11, wherein the composition comprises from about 80% to about 94% by volume of the nitrogen; from about 3% to about 10% by volume of the oxygen; and from about 3% to about 10% by volume of the carbon dioxide.
14. The composition of any one of embodiments 9-10 and 12, wherein the composition comprises from about 0.1% to about 10% by weight of the stabilizer.
15. The composition of any one of embodiments 9, 11, and 13, wherein the composition comprises from about 0.1% to about 10% by volume of the stabilizer.
16. An aerosol dispensing container containing the composition of any one of embodiments 1-8, wherein the composition is under a pressure of greater than 1 atm.
17. The aerosol dispensing container of embodiment 16, wherein the composition further comprises a propellant.
18. The aerosol dispensing container of any one of embodiments 16-17, wherein the composition further comprises:
   a solvent; and
   at least one component selected from the group consisting of: a polymer, a plasticizer, a surfactant, and an adjuvant.
19. The aerosol dispensing container of any one of embodiments 16-18, wherein the composition is stored at a pressure of about 2 atm to about 10 atm.
20. The aerosol dispensing container of any one of embodiments 16-18, wherein the composition is stored at a pressure of about 10 atm to about 100 atm.
21. The aerosol dispensing container of any one of embodiments 16-20, wherein the inside of the container is substantially free of transition metals.

22. A method of preserving the freshness of a plant, comprising contacting the plant with the composition of any one of embodiments 1-15.
23. The method of embodiment 22, wherein the plant is a fruit or vegetable.
24. The method of embodiment 22, wherein the plant is a flower.
25. The method of any one of embodiments 22-24, wherein the contacting comprises spraying the composition of any one of embodiments 1-15 on the plant.
26. A method of packaging a plant, comprising:
placing the plant inside a chamber;
adding the composition of any one of embodiments 9-15 to the inside of the chamber; and
packaging the plant inside the chamber.
27. The method of embodiment 26, wherein the plant is a fruit or vegetable.
28. The method of embodiment 26, wherein the plant is a flower.

A number of embodiments of the invention have been described. Nevertheless, it will be understood that various modifications may be made without departing from the spirit and scope of the invention. Accordingly, other embodiments are within the scope of the following claims.

What is claimed is:

1. A composition comprising:
1-methylcyclopropene; and
a stabilizer selected from the group consisting of: a lower alkane, a lower alkene, a lower dialkyl ether, and combinations thereof;
with the proviso that the 1-methylcyclopropene is not complexed to a host compound or metal complex, and wherein the 1-methylcyclopropene is not adsorbed; and
wherein the composition comprises from about 0.1% to about 10% by weight of the stabilizer; wherein the composition comprises from about 0.1% to about 10% by volume of the 1-methylcyclopropene;
and wherein the composition comprises less than 5% by weight of water.

2. The composition of claim 1, wherein the stabilizer comprises cis-2-butene.

3. The composition of claim 1, wherein the composition is a liquid.

4. The composition of claim 1, wherein the concentration of the 1-methylcyclopropene does not change substantially after at least 4 weeks.

5. The composition of claim 3, further comprising
a solvent; and
at least one component selected from the group consisting of: a polymer, a plasticizer, a surfactant, and an adjuvant.

6. The composition of claim 1, wherein the composition is a gas and further comprises nitrogen, oxygen and carbon dioxide.

7. The composition of claim 6, wherein the composition comprises from about 1% to about 10% by weight of the 1-methylcyclopropene.

8. The composition of claim 6, wherein the composition comprises from about 1% to about 10% by volume of the 1-methylcyclopropene.

9. The composition of claim 6, wherein the composition comprises from about 80% to about 94% by weight of the nitrogen; from about 3% to about 10% by weight of the oxygen; and from about 3% to about 10% by weight of the carbon dioxide.

10. The composition of claim 6, wherein the composition comprises from about 80% to about 94% by volume of the nitrogen; from about 3% to about 10% by volume of the oxygen; and from about 3% to about 10% by volume of the carbon dioxide.

11. The composition of claim 6, wherein the composition comprises from about 0.1% to about 10% by weight of the stabilizer.

12. The composition of claim 6, wherein the composition comprises from about 0.1% to about 10% by volume of the stabilizer.

13. An aerosol dispensing container containing the composition of claim 1, wherein the composition is under a pressure of greater than 1 atm, and wherein the composition further comprises a propellant.

14. The aerosol dispensing container of claim 13, wherein the composition further comprises:
a solvent; and
at least one component selected from the group consisting of: a polymer, a plasticizer, a surfactant, and an adjuvant.

15. The aerosol dispensing container of claim 13, wherein the composition is stored at a pressure of about 2 atm to about 10 atm.

16. The aerosol dispensing container of claim 13, wherein the composition is stored at a pressure of about 10 atm to about 100 atm.

17. The aerosol dispensing container of claim 13, wherein the inside of the container is substantially free of transition metals.

18. A method of preserving the freshness of a plant, comprising contacting the plant with the composition of claim 1.

19. The method of claim 18, wherein the plant is a fruit or vegetable.

20. The method of claim 18, wherein the plant is a flower.

21. The method of claim 18, wherein the contacting comprises spraying the composition on the plant.

22. A method of packaging a plant, comprising:
placing the plant inside a chamber;
adding the composition of claim 6 to the inside of the chamber; and
packaging the plant inside the chamber.

23. The method of claim 22, wherein the plant is a fruit or vegetable.

24. The method of claim 22, wherein the plant is a flower.

* * * * *